US012602000B2

(12) United States Patent
Furukawa

(10) Patent No.: US 12,602,000 B2
(45) Date of Patent: Apr. 14, 2026

(54) IMAGE FORMING SYSTEM AND POST-PROCESSING APPARATUS FOR PRODUCING BOOKLET BY BONDING PLURALITY OF SHEETS

(71) Applicant: CANON KABUSHIKI KAISHA, Tokyo (JP)

(72) Inventor: Hitoshi Furukawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 18/780,770

(22) Filed: Jul. 23, 2024

(65) Prior Publication Data

US 2025/0036063 A1 Jan. 30, 2025

(30) Foreign Application Priority Data

Jul. 27, 2023 (JP) ................................ 2023-122741

(51) Int. Cl.
*G03G 15/00* (2006.01)

(52) U.S. Cl.
CPC ....... *G03G 15/6541* (2013.01); *G03G 15/607* (2013.01); *G03G 2215/00822* (2013.01); *G03G 2215/00936* (2013.01)

(58) Field of Classification Search
CPC ............. G03G 15/6541; G03G 15/607; G03G 2215/00822; G03G 2215/00936
See application file for complete search history.

(56) References Cited

U.S. PATENT DOCUMENTS

2024/0393726 A1* 11/2024 Kataoka ............. G03G 15/6582
2024/0402642 A1* 12/2024 Matsumoto ........ G03G 15/6585

FOREIGN PATENT DOCUMENTS

JP 2004209858 A 7/2004
JP 2015028592 A * 2/2015

* cited by examiner

*Primary Examiner* — David H Banh

(74) *Attorney, Agent, or Firm* — Canon U.S.A., Inc. IP Division

(57) ABSTRACT

An image forming unit forms a user image and a bonding image formed in a binding margin of a booklet and is for bonding a plurality of sheets forming the booklet. A bonding unit bonds the plurality of sheets by applying heat and pressure to the binding margin of the plurality of sheets. The image forming unit forms the bonding image and forms the user image at a first density on a sheet that satisfies a condition for enabling bonding in the bonding unit from among the plurality of sheets. The image forming unit forms the user image and does not form the bonding image or forms the bonding image at a second density lower than the first density on a sheet that does not satisfy the condition for enabling bonding from among the plurality of sheets.

21 Claims, 21 Drawing Sheets

IMAGE FORMING SYSTEM AND POST-PROCESSING APPARATUS FOR PRODUCING BOOKLET BY BONDING PLURALITY OF SHEETS

BACKGROUND

Field

The present disclosure relates to an image forming system and a post-processing apparatus for producing a booklet by bonding a plurality of sheets.

Description of the Related Art

A booklet production apparatus produces a booklet by stapling a plurality of sheets, on which an image has been printed, using an electric stapler. However, metal staples impede the recycling of booklets. According to patent literature 1, a post-processing apparatus for producing a booklet by bonding a plurality of sheets using a powder bonding agent is proposed (Japanese Patent Laid-Open No. 2004-209858).

Incidentally, in some cases, sizes of sheets are inconsistent or materials of sheets are not suitable for bonding. In such cases, when the image forming apparatus forms an image on a sheet using a powder bonding agent (e.g., toner), the powder bonding agent is consumed even though it is difficult to bond sheets.

SUMMARY

The present disclosure provides an image forming system comprising an image forming unit configured to form a user image and a bonding image formed in a binding margin of a booklet and is for bonding a plurality of sheets forming the booklet; and a bonding unit configured to bond the plurality of sheets by applying heat and pressure to the binding margin of the plurality of sheets, wherein the image forming unit forms the bonding image and forms the user image at a first density on a sheet that satisfies a condition for enabling bonding in the bonding unit from among the plurality of sheets, and wherein the image forming unit forms the user image and does not form the bonding image or forms the bonding image at a second density lower than the first density on a sheet that does not satisfy the condition for enabling bonding from among the plurality of sheets.

Further features of the present disclosure will become apparent from the following description of exemplary embodiments (with reference to the attached drawings).

DESCRIPTION OF THE EMBODIMENTS

Figure 1:
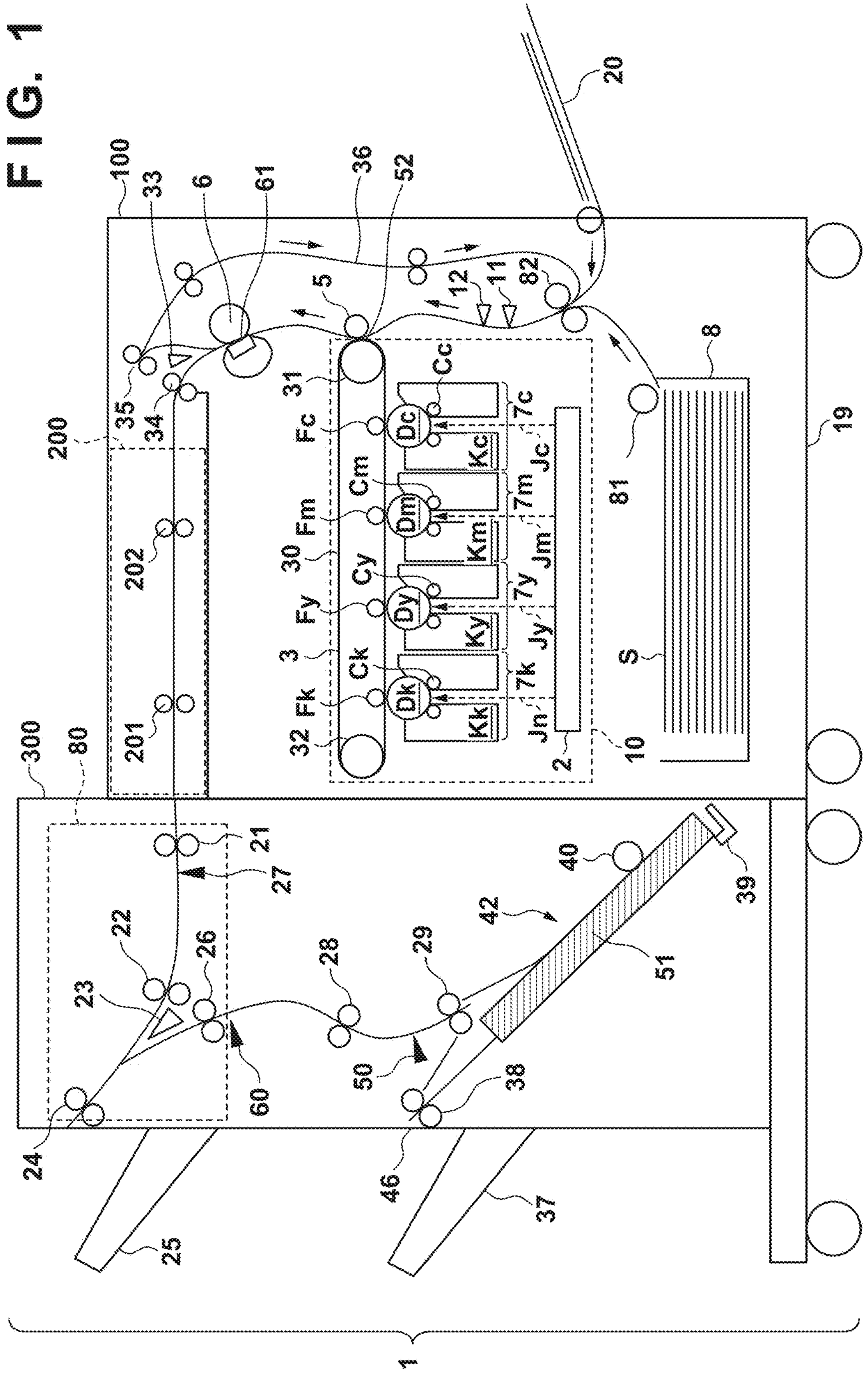
FIG. 1 is a diagram illustrating an image forming system.

Hereinafter, embodiments will be described in detail with reference to the attached drawings. Note, the following embodiments are not intended to be limiting. Multiple features are described in the embodiments, but all such features are not required, and multiple features may be combined as appropriate. Furthermore, in the attached drawings, the same reference numerals are given to the same or similar configurations, and redundant description thereof is omitted.

First Embodiment (1) Image Forming System

As illustrated in FIG. 1, an image forming system 1 includes an image forming apparatus 100 and a post-processing apparatus 300. The post-processing apparatus 300 is a sheet processing apparatus connected to the image forming apparatus 100. The image forming apparatus 100 forms an image on a sheet S, which is a printing material. An intermediate conveyance unit 200 conveys the sheet S on which the image has been formed to the post-processing apparatus 300. The post-processing apparatus 300 performs post-processing on the sheet S as necessary and outputs the sheet S.

The image forming apparatus 100 includes a sheet cassette 8, an image forming unit 10, a fixing device 6, and a housing 19, which houses these. The image forming unit 10 forms a toner image on a sheet S fed from the sheet cassette 8. The fixing device 6 executes fixing processing for fixing the toner image on the sheet S.

The sheet cassette 8 is provided at a lower portion of the image forming apparatus 100. The sheet cassette 8 is inserted so as to be capable of being pulled out from the housing 19 and can store a large number of sheets S. A feeding roller 81 feeds a sheet S from the sheet cassette 8 and passes the sheet S to a pair of conveyance rollers 82. A multi-tray 20 can also feed sheets S one at a time.

The image forming unit 10 is a tandem-type electrophotographic unit including four process cartridges 7*k*, 7*y*, 7*m*, and 7*c*, a scanner unit 2, and a transfer unit 3. y, m, c, and k mean yellow, magenta, cyan, and black, respectively. Regarding the process cartridges 7*k*, 7*y*, 7*m*, and 7*c*, a plurality of components responsible for image forming processing can be replaced in an integrated manner. That is, the process cartridges 7*k*, 7*y*, 7*m*, and 7*c* are formed by a plurality of components being integrated.

The process cartridges **7*k*, 7*y*, 7*m*, and 7*c* include corresponding toner containers Kk, Ky, Km, and Kc, photosensitive drums Dk, Dy, Dm, and Dc, and charging rollers Ck, Cy, Cm, and Cc. The structures of the process cartridges 7*k*, 7*y*, 7*m*, and 7*c*** are substantially the same except for a type of toner.

The toner containers Ky, Km, and Kc contain yellow, magenta, and cyan toner for forming a visible image on a sheet S. The toner container Kk contains black toner, which is also used as bonding toner. When the black toner is used for a bonding image, the black toner is referred to as bonding toner Tk. The bonding toner Tk is a powder bonding agent used for bonding a plurality of sheets S by thermocompression in the post-processing apparatus 300. A bonding image is formed on the photosensitive drum Dk by an electrostatic latent image being developed using the bonding toner Tk. The bonding image is not intended to convey visual information. Therefore, the bonding image is different from a toner image (normal toner image) formed using printing toner for printing an image, such as a shape or text, on a sheet S. However, in the following description, the bonding toner Tk is applied to a sheet S in a predetermined application pattern. Therefore, a layered bonding toner Tk image developed by an electrophotographic process is also treated as one of the "toner images".

When printing a black image, such as text, a black image (process black) can be realized by overlapping yellow, magenta, and cyan toner. In this case, the process cartridge **7*k* is a process cartridge dedicated to a powder bonding agent. However, the image forming unit 10 can include a fifth process cartridge in which a powder bonding agent is used. The types and the number of printing toners can be changed according to the purpose of the image forming apparatus 100**.

The charging rollers Ck, Cy, Cm, and Cc are charging devices and uniformly charge the surfaces of the respective corresponding photosensitive drums Dk, Dy, Dm, and Dc. The scanner unit 2 is arranged below the process cartridges **7*k*, 7*y*, 7*m*, and 7*c* and above the sheet cassette 8. The scanner unit 2 forms electrostatic latent images by irradiating the photosensitive drums Dk, Dy, Dm, and Dc with respective corresponding laser beams Jk, Jy, Jm, and Jc. The scanner unit 2** can be referred to as an exposure device or an optical scanning device.

The toner containers Kk, Ky, Km, and Kc form toner images by causing toner to adhere to electrostatic latent images on the photosensitive drums Dk, Dy, Dm, and Dc. The toner containers Kk, Ky, Km, and Kc can be referred to as developing devices.

The transfer unit 3 includes a transfer belt 30 serving as an intermediate transfer member (secondary image carrier). The transfer belt 30 is an endless belt wound around an inner roller 31 and a tension roller 32. An outer peripheral surface (image forming surface) of the transfer belt 30 faces the photosensitive drums Dk, Dy, Dm, and Dc. Primary transfer rollers Fk, Fy, Fm, and Fc are arranged on an inner peripheral side of the transfer belt 30 so as to face the photosensitive drums Dk, Dy, Dm, and Dc.

The primary transfer rollers Fk, Fy, Fm, and Fc transfer toner images from the corresponding photosensitive drums Dk, Dy, Dm, and Dc to the transfer belt 30. The primary transfer rollers Fk, Fy, Fm, and Fc can be referred to as a primary transfer device. By the transfer belt 30 rotating counterclockwise, the toner images are conveyed to a secondary transfer portion.

A secondary transfer roller 5 is arranged so as to face the inner roller 31, and a transfer nip 52 is formed between the secondary transfer roller 5 and the transfer belt 30. The transfer nip 52 transfers toner images from the transfer belt 30 to a sheet S. The transfer nip 52 can be referred to as the secondary transfer portion.

The fixing device 6 is arranged above the secondary transfer roller 5 (downstream in the conveyance direction of a sheet S). The fixing device 6 applies heat and pressure to a sheet S passing through a fixing nip 61. As a result, toner images are fixed on the sheet S. That is, toners Ty, Tm, Tc and Tk are melted and fixed on the sheet S.

Figure 2A:
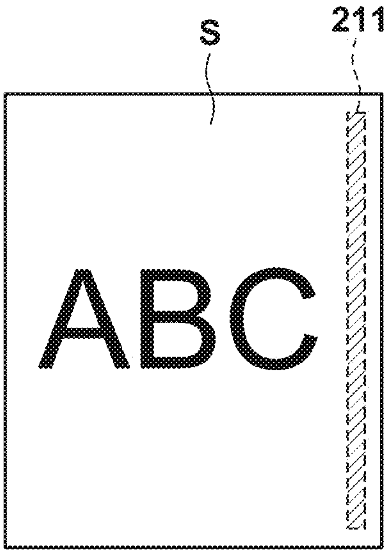
FIGS. 2A and 2B are diagrams illustrating a position at which to form a bonding image.

FIG. 2A illustrates a printing region 211 for the bonding toner Tk. The printing region 211 extends parallel to a long side of a sheet S. The printing region 211 is provided at an edge portion close to the long side. As a result, by the post-processing apparatus 300 stacking a plurality of sheets S and applying heat and pressure to the printing region 211 of the plurality of sheets S, the plurality of sheets S are bonded, and a booklet is formed. The booklet in this case is a booklet bound on a long side. Here, a width (length in a short-side direction) of the printing region 211 in which a bonding image is to be formed is, for example, 4.0 mm.

Figure 2B:
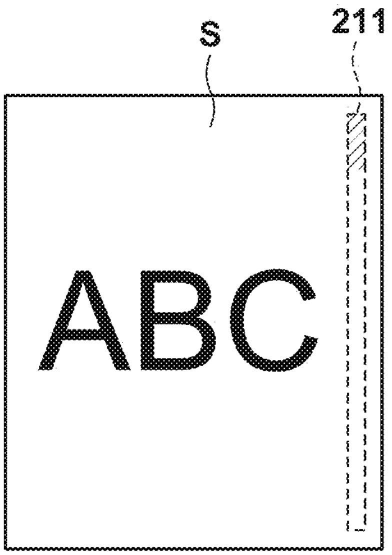

As illustrated in FIG. 2B, a small printing region 212 for the bonding toner Tk can be formed near a corner of a sheet S. As a result, a booklet bound on a corner is produced. An image for which the bonding toner Tk is used is not formed on a sheet S serving as the front cover of a booklet.

As illustrated in FIG. 1, a switching guide 33 is a flap-shaped guide member provided downstream of the fixing device 6 in the conveyance direction of a sheet S. When single-sided printing mode for forming an image on one side of a sheet S is selected, the switching guide 33 guides a sheet S to discharge rollers 34. When double-sided printing mode for forming an image on both sides of a sheet S is selected, the switching guide 33 guides a sheet S on which an image has been formed on a first surface to a pair of switchback rollers 35. The pair of switchback rollers 35 conveys the sheet S in a first direction. When a state in which the trailing edge of the sheet S can enter a double-sided conveyance path 36 is entered, the pair of switchback rollers 35 starts reversing. As a result, the sheet S is conveyed to the double-sided conveyance path 36. The double-sided conveyance path 36 conveys the sheet S to the secondary transfer portion again. As a result, an image is formed on a second surface of the sheet S. A bonding image can be formed on both the first surface and the second surface.

The discharge rollers 34 convey a sheet S to the intermediate conveyance unit 200. The intermediate conveyance unit 200 includes pairs of conveyance rollers 201 and 202. The pairs of conveyance rollers 201 and 202 convey the sheet S to the post-processing apparatus 300.

According to FIG. 1, a size sensor 11 and a media sensor 12 can be arranged in a conveyance path between the pair of conveyance rollers 82 and the secondary transfer portion. The size sensor 11 is a sensor that detects a length of a sheet S, conveyed by the pair of conveyance rollers 82, in the first direction (conveyance direction) and a length of the sheet S in a second direction (direction orthogonal to the conveyance direction). The media sensor 12 is a sensor that determines a type (e.g., material and grammage) of a sheet S.

(2) Post-Processing Apparatus

The post-processing apparatus 300 is a floor-standing-type sheet processing apparatus. The post-processing apparatus 300 includes a function (switchback unit 80) for switching back and conveying a sheet and a function (intermediate stack section 42) for aligning and bonding a plurality of sheets.

Hereinafter, an edge portion of a sheet S on a front side in the conveyance direction is referred to as a leading edge. An edge portion of a sheet S on a back side in the conveyance direction is referred to as a trailing edge. Of the two edge portions of a sheet S, an edge portion that first enters the post-processing apparatus 300 is referred to as a first edge. Of the two edge portions of a sheet S, an edge portion that enters the post-processing apparatus 300 later is referred to as a second edge. In some cases, the leading edge is changed from the first edge to the second edge, and the trailing edge is changed from the second edge to the first edge by switchback conveyance executed by the post-processing apparatus 300.

A sheet S conveyed from the intermediate conveyance unit 200 is transferred to inlet rollers 21 of the post-processing apparatus 300. A sheet sensor 27 is arranged downstream of the inlet rollers 21. When the sheet sensor 27 detects the trailing edge of the sheet S, a pair of conveyance rollers 22 accelerates the sheet S. When the trailing edge of a sheet S for which an upper tray 25 is set as a discharge destination arrives between the pair of conveyance rollers 22 and a pair of conveyance rollers 24, the pair of conveyance rollers 22 decelerates. As a result, the conveyance velocity of the sheet S becomes a predetermined discharge speed. The pair of conveyance rollers 24 discharges the sheet S to the upper tray 25.

When the trailing edge of a sheet S for which a lower tray 37 is set as a discharge destination exits a backflow prevention valve 23, the pair of conveyance rollers 24 stops the conveyance of the sheet S. Then, the pair of conveyance rollers 24 starts reverse rotation. As a result, the sheet S is switched back and conveyed to a pair of conveyance rollers 26. When a sheet sensor 60 provided downstream of the pair of conveyance rollers 26 detects the leading edge of the sheet S, two rollers constituting the pair of conveyance rollers 24 are separated. As a result, the pair of conveyance rollers 24 can receive a subsequent sheet S.

The pair of conveyance rollers 26 conveys the sheet S toward the intermediate stack section 42. The sheet S passes through a pair of conveyance rollers 28 and a sheet sensor 50. Further, the sheet S is conveyed to the intermediate stack section 42 by kick-out rollers 29. A movable vertical alignment plate 39 is arranged at a standby position in the most downstream portion of the intermediate stack section 42. By a plurality of sheets S being fed to the intermediate stack section 42, the plurality of sheets S are stacked. By the plurality of sheets S abutting the vertical alignment plate 39, the plurality of sheets S are aligned.

When the alignment of the predetermined number of sheets S is completed, a thermocompression bonding unit 51 executes a binding operation (bonding processing). As a result, a booklet is formed. By the vertical alignment plate 39 moving from the standby position to a discharge position, the booklet is pushed toward discharge rollers 38. When the leading edge of the booklet is nipped by the discharge rollers 38, the vertical alignment plate 39 stops and returns to the standby position again. The discharge rollers 38 discharge the booklet received from the vertical alignment plate 39 from a discharge port 46 to the lower tray 37.

(3) Alignment Operation

FIGS. 3A to 3D illustrate an alignment operation of sheets S executed in the intermediate stack section 42. An initial state is a state in which the intermediate stack section 42 is empty. As one example, five sheets S are conveyed from the switchback unit 80 to the intermediate stack section 42 in order.

A Y direction is a direction parallel to a stacking surface (stacking plate) of a sheet S in the intermediate stack section 42 and parallel to the conveyance direction of a sheet S conveyed from the kick-out rollers 29 to the intermediate stack section 42. The Y direction can be referred to as a vertical direction. An X direction is a direction parallel to a stacking surface of a sheet S in the intermediate stack section 42 and orthogonal to the Y direction. The X direction can be referred to as a horizontal direction. A Z direction is a direction orthogonal to the X direction and the Y direction (direction of a normal of the stacking surface and thickness direction of stacked sheets S). The Z direction can be referred to as a height direction. Regarding the X, Y, and Z directions, opposite directions are sometimes referred to as −X, −Y, and −Z directions, respectively.

The vertical alignment plate 39 and a vertical alignment roller 40 function as a first alignment unit, which aligns a plurality of sheets S in a first direction (Y direction). The vertical alignment plate 39 is arranged at the most downstream portion of the intermediate stack section 42 in the Y direction. The vertical alignment plate 39 is a reference member (first reference member) serving as a reference for a sheet position in the Y direction. The vertical alignment roller 40 is a conveyance member that conveys sheets S in the Y direction in order to align the sheets S by causing them to abut the vertical alignment plate 39. The vertical alignment plate 39 includes a plurality of contact members 39*a* to 39*c* arranged so as to be spaced apart in the X direction. The plurality of contact members 39*a* to 39*c* contact an edge portion of sheets S. The vertical alignment plate 39 and the vertical alignment roller 40 are integrally formed as a movable unit 59, which is movable in the Y direction. The movable unit 59 is movable in the Y direction by a driving source, such as a motor. That is, the positions of the vertical alignment plate 39 and the vertical alignment roller 40 in the Y direction can be adjusted. Horizontal alignment joggers 41*a* to 41*c* function as a second alignment unit that aligns sheets in a second direction (X direction) orthogonal to the first direction.

The horizontal alignment joggers 41*a* to 41*c* are moved in the X direction by a driving source, such as a motor, and press a side edge of sheets S stacked on the intermediate stack section 42. Horizontal alignment plates 72*a* and 72*b* are reference members serving as a reference for a position of sheets S in the X direction. The horizontal alignment plates 72*a* and 72*b* are arranged so as to face the horizontal alignment joggers 41*a* and 41*b* in the X direction.

(3-1) Preparatory Stage

Figure 3B:
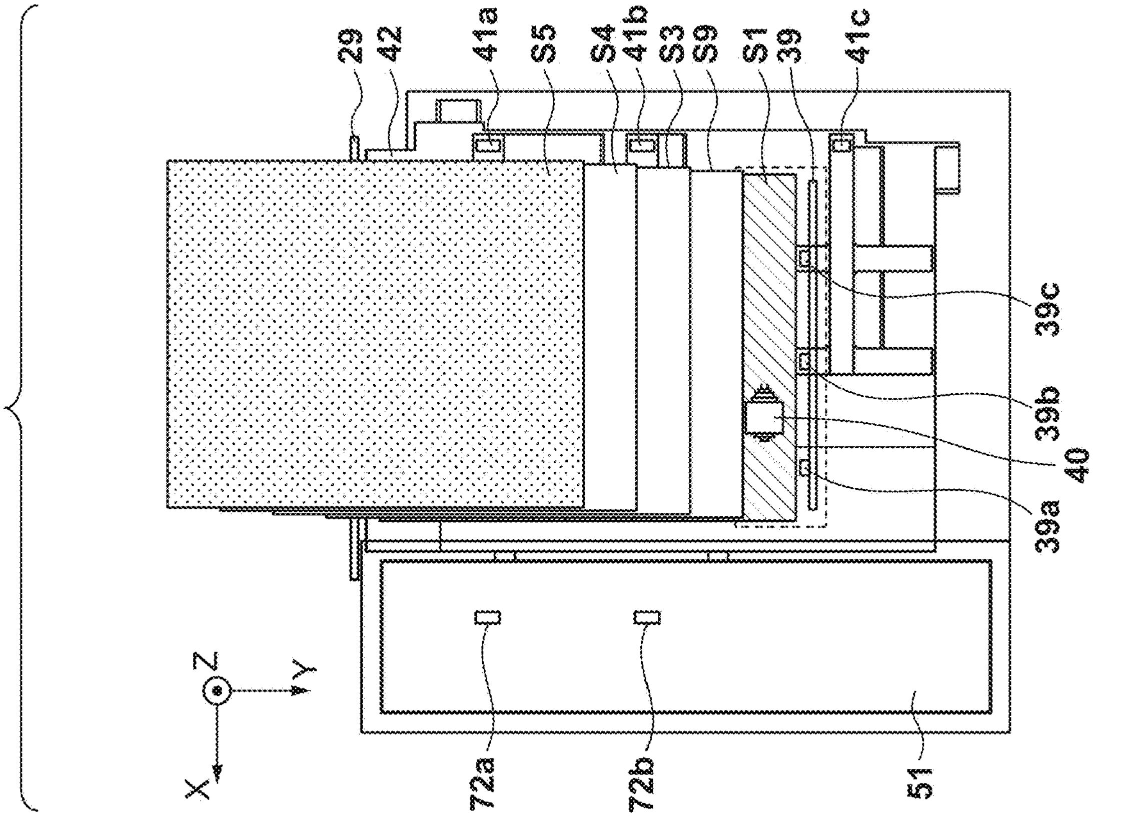
FIGS. 3A to 3D are diagrams illustrating an operation of an intermediate stack section.
Figure 3A:
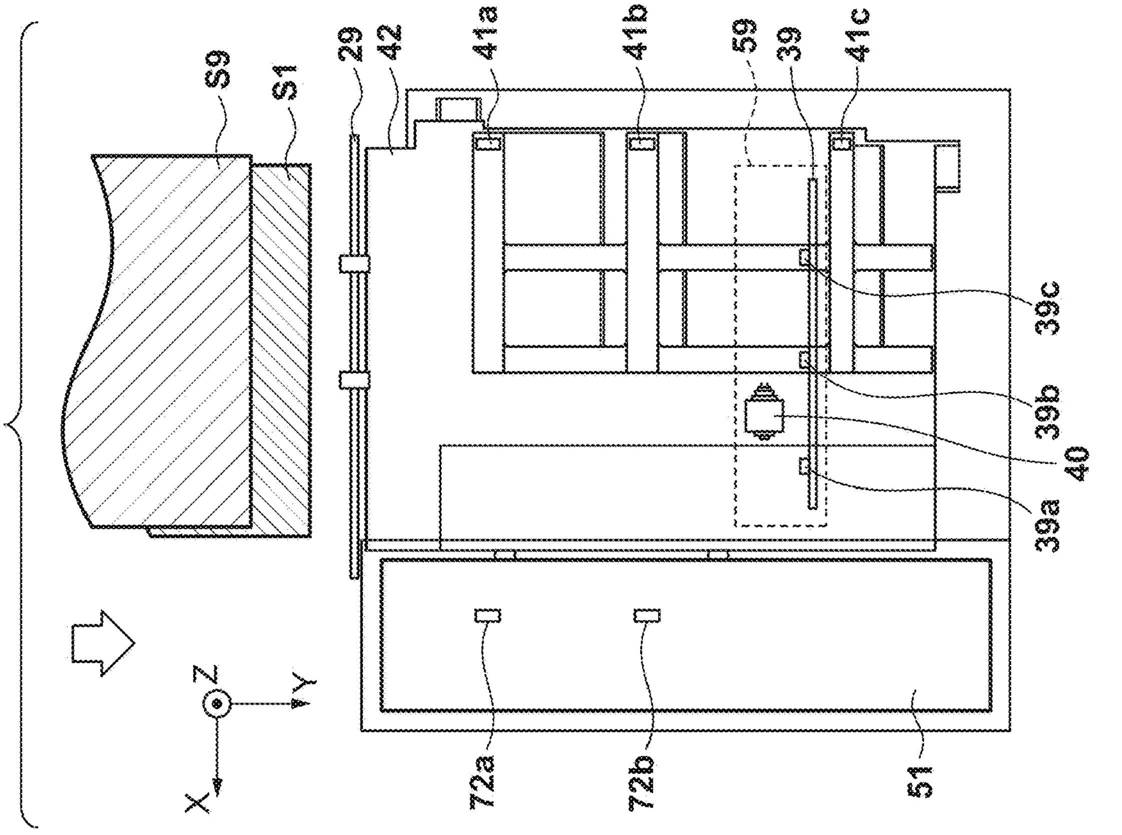

As illustrated in FIG. 3A, sheets S1 to S5 are conveyed toward the kick-out rollers 29. The sheets S1 to S5 can be conveyed to the intermediate stack section 42 in a state in which a sheet Si positioned in a lower rank protrudes in the Y direction than a sheet Si+1 positioned in a higher rank. Before a sheet S is stacked in the intermediate stack section 42, the vertical alignment plate 39 is moved in advance to a predetermined standby position according to the size of sheets S to be aligned. The standby position is set such that a position of an edge portion of sheets S in the −Y direction is constant regardless of the size of sheets S. In other words, the standby position is a position at which a distance in the Y direction from a nip position of the kick-out rollers 29 to the vertical alignment plate 39 is slightly longer than a length of sheets in the Y direction. The horizontal alignment joggers 41*a* to 41*c* stand by at a position that is separated outward in the X direction from sheets S being conveyed so as not to interfere with the conveyance of the sheets S.

(3-2) Vertical Alignment Stage

FIG. 3B illustrates the trailing edge of the first sheet S1 exiting the nip of the kick-out rollers 29 and the leading edge of the sheet S1 reaching the vertical alignment roller 40. The sheet S1 abuts the vertical alignment plate 39 and is aligned with the position of the vertical alignment plate 39 as the reference. By the vertical alignment roller 40 continuously rotating, the sheets S2 to S5 reaching the vertical alignment roller 40 subsequent to the sheet S1 sequentially abut the vertical alignment plate 39. As a result, the five sheets S1 to S5 are aligned in the Y direction (vertical direction) with the position of the vertical alignment plate 39 as the reference.

(3-3) Horizontal Alignment Stage

Figure 3D:
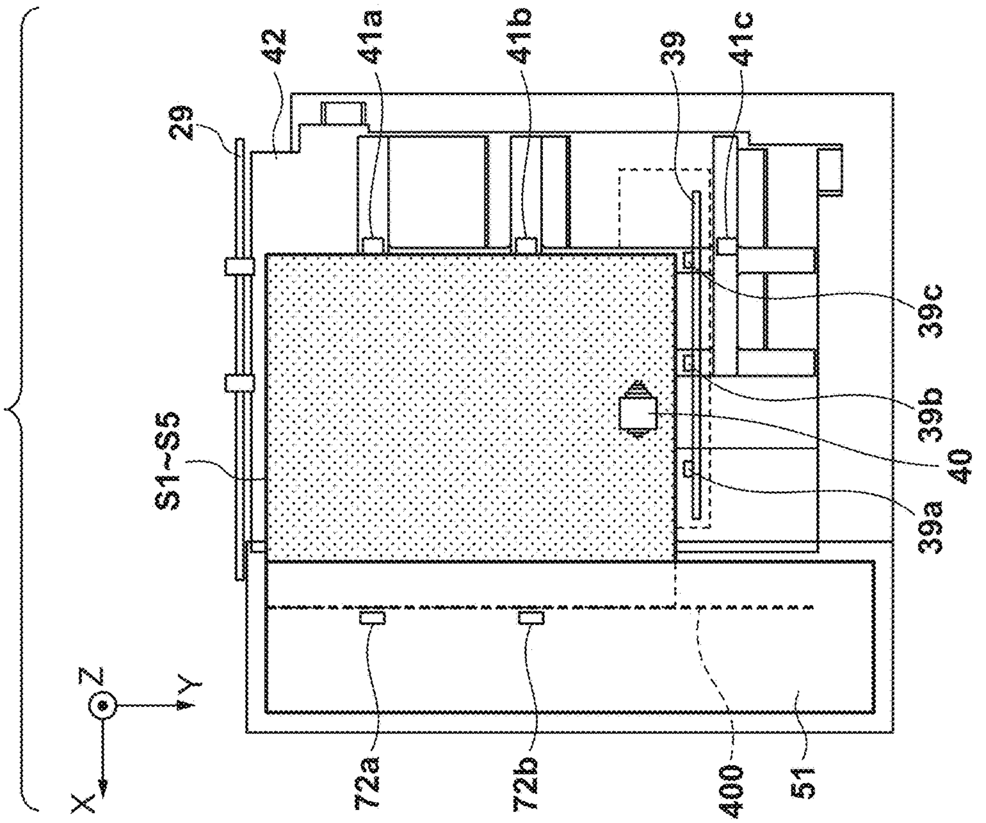
Figure 3C:
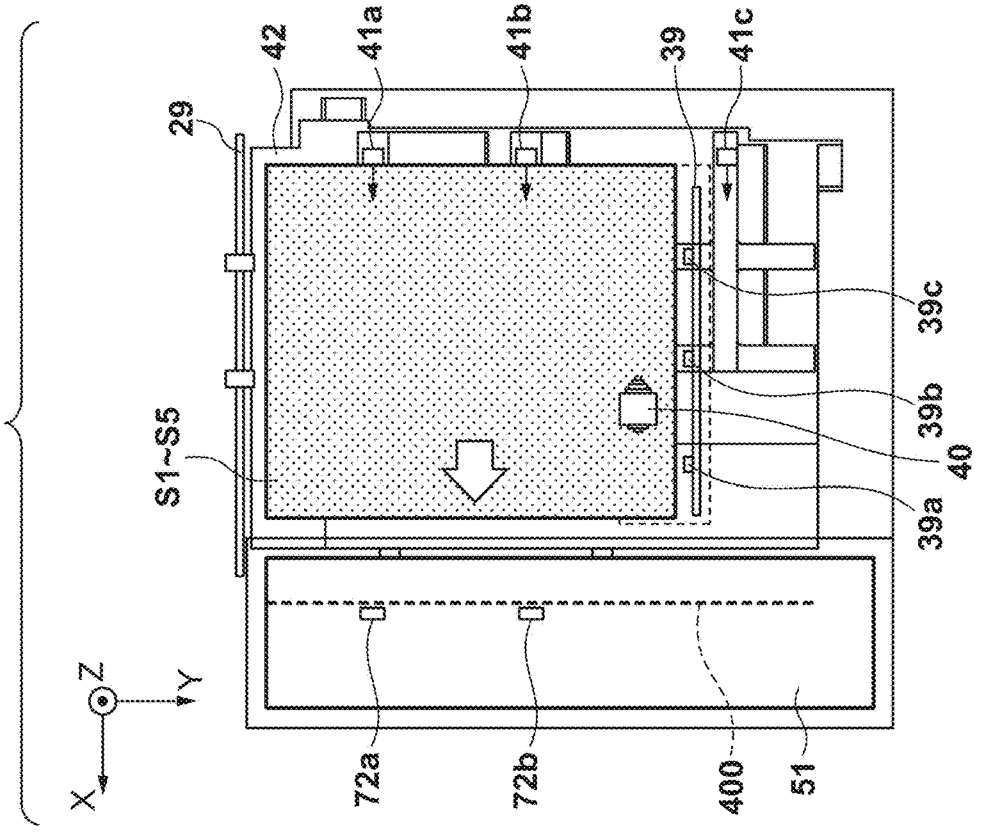

FIG. 3C illustrates the alignment of the sheets S1 to S5 in the X direction (horizontal direction) being started after the alignment in the Y direction (vertical direction) is completed. The horizontal alignment joggers 41*a* to 41*c* are driven in the X direction, which is an alignment direction, contacts a side edge of the sheets S1 to S5, and presses the sheets S1 to S5 toward the horizontal alignment plates 72*a* and 72*b*. Then, by the other side edge of the sheets S1 to S5 contacting a contact surface 400 of the horizontal alignment plates 72*a* and 72*b*, the sheets S1 to S5 are aligned in the X direction (horizontal direction) with the position of the horizontal alignment plates 72*a* and 72*b* as the reference.

(3-4) Bonding Stage (Thermocompression Bonding Stage)

FIG. 3D illustrates a state in which the alignment of the five sheets S1 to S5 in the X direction and the Y direction is completed. A target position (alignment position) in the alignment operation is a position of the sheet bundle W for when the bonding processing (thermocompression bonding) is performed by the thermocompression bonding unit 51. As described above, the image forming apparatus 100 applies the bonding toner Tk to the sheets S1 to S5 such that sides on which a bonding image is formed are on the thermocompression bonding unit 51 side. When the sheet S1 is the front cover of a booklet, the bonding toner Tk is not applied.

The thermocompression bonding unit 51 subjects the sheets S1 to S5, which have been aligned, to a thermocompression bonding operation. During this time, the horizontal alignment joggers 41*a* to 41*c* retract in the −X direction. As a result, the intermediate stack section 42 enters a state in which it can receive the next plurality of sheets S.

As one example, when a sheet bundle W constituted by five sheets S is formed, the thermocompression bonding unit 51 executes the thermocompression bonding processing. However, the number of sheets S constituting the sheet bundle W can be two or three, for example. That is, the number of sheets S included in the sheet bundle W can be less than or equal to a maximum number of sheets S that can be stacked in the intermediate stack section 42. Further, the thermocompression bonding unit 51 can execute the thermocompression bonding processing each time one sheet S (excluding a sheet S serving as the front cover) is conveyed to the intermediate stack section 42.

(4) Thermocompression Bonding Unit

Figure 4:
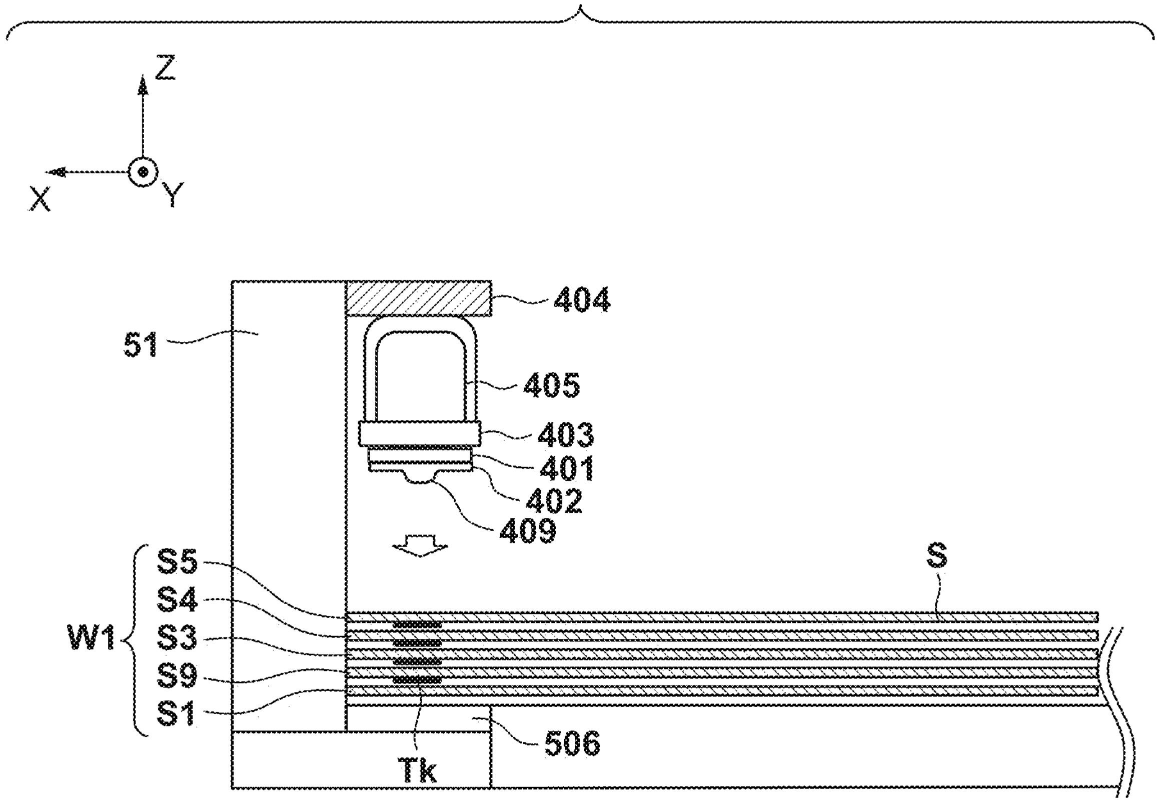
FIG. 4 is a diagram illustrating an operation of a thermocompression bonding unit.

As illustrated in FIG. 4, the thermocompression bonding unit 51 includes a heater 401 and a heating plate 402. The heater 401 incorporates a heating element as a heating source. The heating plate 402 is arranged on the heater 401 and is made of aluminum, for example. The heater 401 is a ceramic heater, for example. The temperature of the heater 401 can be measured by a temperature sensor and controlled by a control circuit such that the measured temperature is a target temperature. For example, the target temperature is set such that the surface temperature of a pressing portion 409 of the heating plate 402 is 200° C. By providing the pressing portion 409 in the heating plate 402, the heat and pressure of the thermocompression bonding unit 51 are concentrated at a binding position of a sheet bundle W. As a result, heating and pressing efficiency is improved.

The heater 401 is supported by a heater support 403 made of resin. A pressing lever 404 obtains power from a motor M8 illustrated in FIG. 6 in order to push the thermocompression bonding unit 51 down in the −Z direction (down direction) and press a sheet bundle W. The pressing force of the pressing lever 404 is transmitted to the pressing portion 409 via a metal stay 405, which is a rigid body. The pressing force of the pressing lever 404 can be controlled according to an amount by which the pressing lever 404 is moved in the −Z direction (down direction). For example, the pressing force is 30 kgf.

A pressing plate 406 is formed of an elastic material (e.g., silicone rubber). This is because the pressing plate 406 is a member for stably receiving the pressing force. The thermocompression bonding unit 51 presses a sheet bundle W1 constituted by sheets S1 to S5 and then separates from the sheet bundle W1. The sheets S1 to S5 of FIG. 4 indicate the first to fifth sheets of a booklet, which is a product. The sheet S1 is the front cover of the booklet. Therefore, a bonding toner Tk image is not formed on the sheet S1. Bonding toner Tk images are formed on the lower surfaces of second and subsequent sheets S2 to S5 of the booklet.

When the thermocompression bonding operation of a booklet is completed in the intermediate stack section 42, the vertical alignment plate 39 is moved from the standby position to a discharge position. That is, by the vertical alignment plate 39 being translated toward the discharge port 46, the completed booklet is pushed out. The discharge rollers 38 are provided at the discharge port 46. When the leading edge of the booklet goes slightly past the discharge rollers 38, the vertical alignment plate 39 stops and returns to the standby position again. The discharge rollers 38 discharge the booklet to the lower tray 37.

As one example, a maximum size of a sheet S on which an image can be formed is a legal size (356 mm in height×216 mm in width). A maximum size of a sheet S that can be fed to the intermediate stack section 42 in the Y direction is 297 mm (long side of an A4-sized sheet). A maximum size in the X direction is 216 mm (short side of a letter-sized sheet). A minimum size of a sheet S that can be fed to the intermediate stack section 42 in the Y direction is 210 mm (long side of an A5-sized sheet). A minimum size in the X direction is 148 mm (short side of an A5-sized sheet).

(5) Controllers

Figure 5:
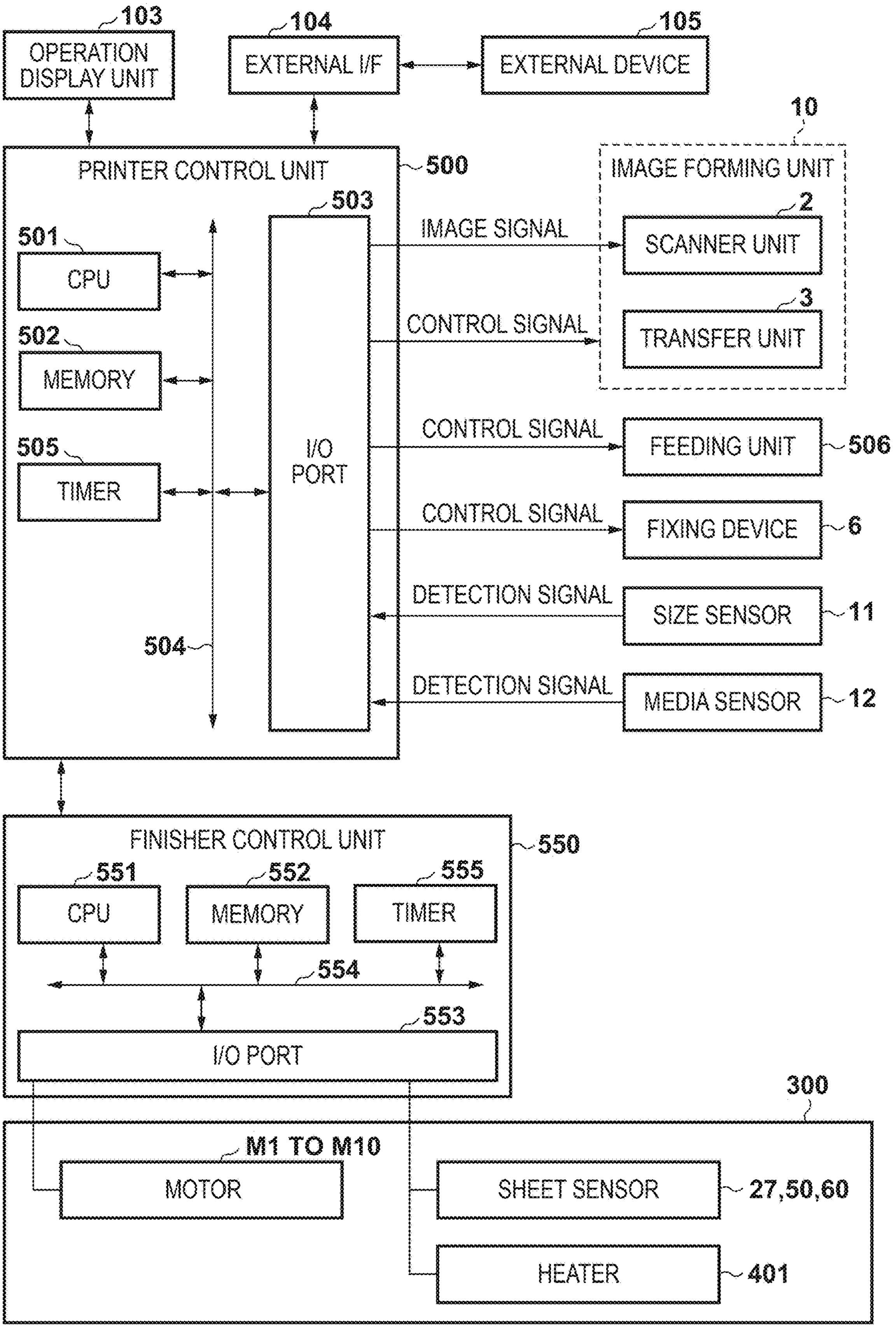
FIG. 5 is a diagram illustrating control units.

FIG. 5 is a diagram illustrating controllers of the image forming system 1. A printer control unit 500 is a controller that controls the image forming apparatus 100. A finisher control unit 550 is a controller that controls the post-processing apparatus 300. The printer control unit 500 and the finisher control unit 550 are connected to each other via a communication interface and control the operation of the image forming system 1 in cooperation with each other.

The printer control unit 500 includes a central processing unit (CPU) 501, a memory 502, an I/O port 503, a bus 504, and a timer 505. The CPU 501, the memory 502, the I/O port 503, and the timer 505 are connected via the bus 504.

The CPU 501 reads and executes a program stored in the memory 502 and controls the image forming apparatus 100 according to the program. The CPU 501 executes image forming processing, sheet conveyance processing, and the like in the image forming apparatus 100. The memory 502 includes a non-volatile storage medium, such as a read-only memory (ROM), and a volatile storage medium, such as a random access memory (RAM). The memory 502 stores programs and data and provides a working area for when the CPU 501 executes the programs. The memory 502 is an example of a non-transitory storage medium storing a program for controlling the image forming apparatus 100.

The printer control unit 500 is connected to an external device 105, such as a personal computer (PC) and a portable information device, via an external interface (I/F) 104. The printer control unit 500 accepts an instruction to execute an image forming job and the like for the image forming system 1, which are inputted from the external device 105. The printer control unit 500 is connected to an operation display unit 103, which is a user interface of the image forming system 1. The operation display unit 103 includes a display device (e.g., liquid crystal panel that presents information to a user) and an input device (e.g., physical button and touch sensor that accept an input operation by the user). By communicating with the operation display unit 103, the printer control unit 500 controls the display content of the display device and receives information inputted via the input device.

The CPU 501 outputs an image signal to the scanner unit 2 via the I/O port 503. The CPU 501 outputs control signals to the image forming unit 10, a feeding unit 506, the fixing device 6, and the like via the I/O port 503. The feeding unit 506 includes motors that drive the feeding roller 81, the pair of conveyance rollers 82, and the like, and driving circuits thereof. The CPU 501 receives detection signals from the size sensor 11 and the media sensor 12 via the I/O port 503. The CPU 501 determines the size of a sheet S based on the detection signal outputted from the size sensor 11. The CPU 501 determines the type of a sheet S based on the detection signal outputted from the media sensor 12.

The size sensor 11 includes, for example, a light emitting element (e.g., LED) that emits light toward the surface of a sheet S and a light receiving element that receives light reflected off of the surface of the sheet S. The light receiving element can be, for example, a line sensor constituted by a plurality of photoelectric conversion elements arranged in a direction orthogonal to the conveyance direction of a sheet S. The CPU 501 estimates the width of a sheet S based on the number of pixels for which light reflected off of the sheet S has been detected from among a plurality of pixels (photoelectric conversion elements) included in the line sensor. The CPU 501 measures a duration, for which light reflected off of the sheet S has continuously been detected while the sheet S is being conveyed, using the timer 505 and estimates the length of the sheet S based on a measurement result.

The media sensor 12 includes, for example, a light emitting element that emits light toward a sheet S and a light receiving element that receives light that has been transmitted through the sheet S. The CPU 501 estimates the type of a sheet S based on an intensity of received light that has been transmitted through the sheet S. As types, there are plain paper, thick paper, thin paper, an OHP sheet (overhead projector sheet), and the like. The size sensor 11 and the media sensor 12 are not limited to these and can be any sensor that can detect the length, width, and type of sheet S.

The finisher control unit 550 includes a CPU 551, a memory 552, an I/O port 553, and a timer 555. The CPU 551 reads and executes a program stored in the memory 552 and controls the post-processing apparatus 300 according to the program. The memory 552 includes a non-volatile storage medium (e.g., the ROM, SSD, and the HDD) and a volatile storage medium (e.g., the RAM). SSD is an abbreviation for solid state drive. HDD is an abbreviation for hard disk drive. The memory 552 stores programs and data and provides a working area for when the CPU 551 executes the programs. The memory 552 is an example of a non-transitory storage medium storing a program for controlling the post-processing apparatus 300. The CPU 551, the memory 552, and the I/O port 553 are connected to each other via a bus 554. The I/O port 553 outputs control signals to and receives signals from various components of the post-processing apparatus 300.

The I/O port 553 is connected with the sheet sensors 27, 50, and 60 and the heater 401. The I/O port 553 is connected with motors M1 to M10, which are driving sources for conveying a sheet S and a driving source of the thermocompression bonding unit 51.

The motor M1 rotationally drives the inlet rollers 21. The motor M2 rotationally drives the pair of conveyance rollers 22. The motor M3 rotationally drives the pair of conveyance rollers 24. The motor M4 rotationally drives the pair of conveyance rollers 26. The motor M5 rotationally drives the kick-out rollers 29. The motor M6 supplies a driving force for intermittently operating the vertical alignment roller 40 one rotation at a time. The motor M7 moves the horizontal alignment joggers 41 in the +X direction or −X direction. The motor M8 causes the thermocompression bonding unit 51 to perform an operation for bonding the sheet bundle W by pressure. The motor M9 rotationally drives the discharge rollers 38. The motor M10 drives the vertical alignment plate 39 in the +Y direction or −Y direction.

The timer 555 is used to manage various timings within the post-processing apparatus 300. For example, the CPU 551 can detect the length of a sheet S in the conveyance direction by combining the sheet sensor 27 and the timer 555.

(6) Functions Realized by CPUs

Figure 6:
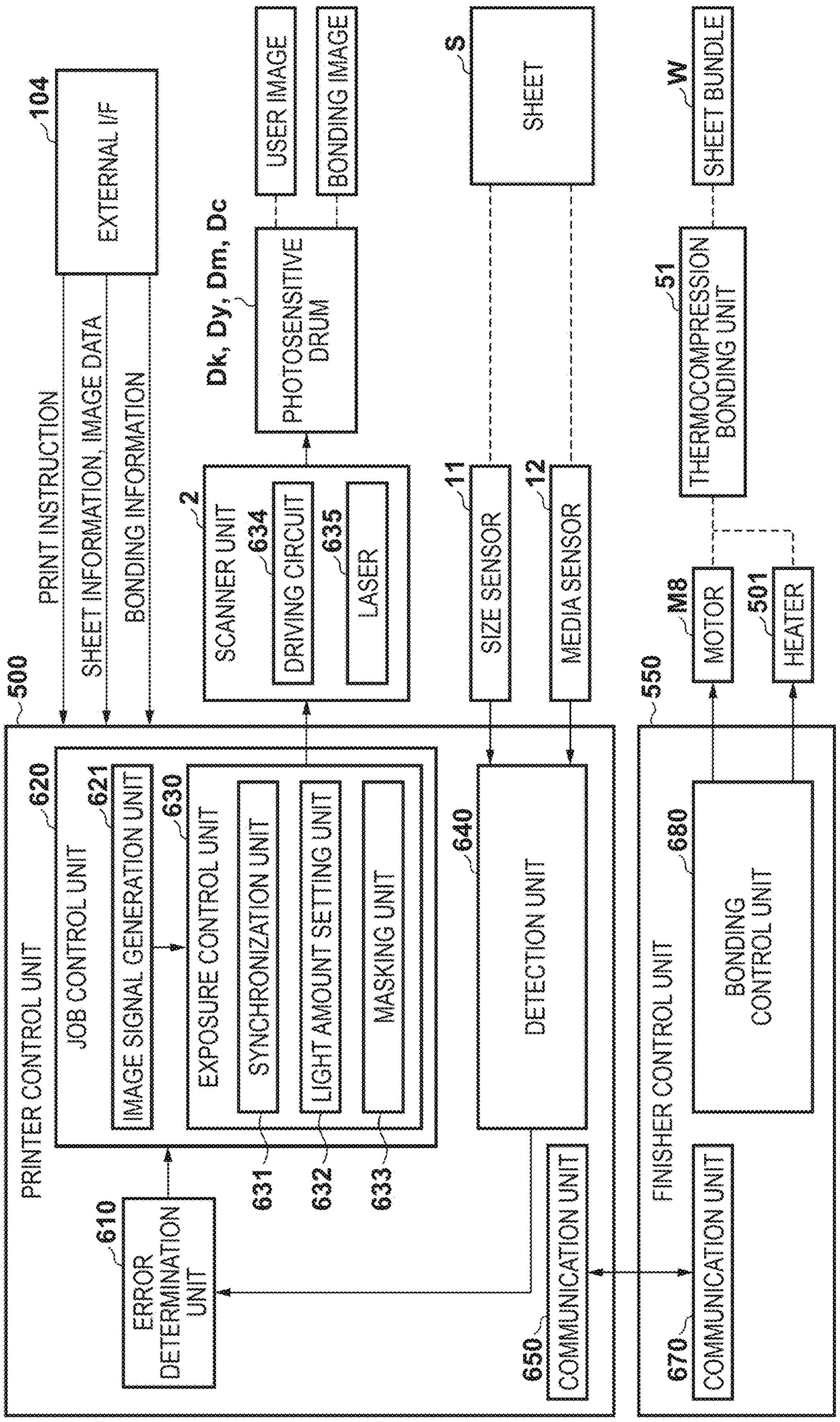
FIG. 6 is a diagram illustrating functions of the control units.

FIG. 6 illustrates functions realized by the CPU 501 and the CPU 551 executing a control program. Each function included in the printer control unit 500 and the finisher control unit 550 can be implemented as independent hardware, such as an ASIC, or can be implemented in software as a program module. ASIC is an abbreviation for application-specific integrated circuit. The printer control unit 500 can be responsible for some or all of the functions of the finisher control unit 550.

An image signal generation unit 621 receives a print instruction, sheet information, image data, bonding information, and the like transmitted from a host computer or the like via the external I/F 104. The sheet information is, for example, a sheet size (e.g., A4, B4, or letter) and a sheet type (e.g., plain paper, thick paper, thin paper, or OHP sheet). The image data includes a user image (e.g., shape and text) arbitrarily prepared by the user. The bonding information is, for example, a binding type (e.g., long-side binding designation, corner binding designation, or no binding designation) and the number of sheets to be bound (e.g., 0 to 20 sheets). When the bonding information includes a binding designation, the image signal generation unit 621 generates a bonding image according to the sheet size. In the present embodiment, the black toner Tk is used to form the bonding image. For example, when the bonding information includes a long-side binding designation, the image signal generation unit 621 generates bonding image data such that a black image (a solid image) is formed in the printing region 211. When the bonding information includes a corner binding designation, the image signal generation unit 621 generates bonding image data such that a black image is formed in a printing region 212. The image signal generation unit 621 generates combined image data for the process cartridge **7*k*** by overlapping the bonding image data and the user image data. The process cartridges 7*y*, 7*m*, and 7*c* are not used to form a bonding image. Therefore, image data for the process cartridge 7*y*, 7*m*, 7*c* is the combined image data only including the user image. The image signal generation unit 621 generates an image signal by performing dithering processing on the combined image data at a designated resolution (e.g., 600 dpi) and outputs the image signal to an exposure control unit 630.

The exposure control unit 630 causes a laser 635 to generate the laser beams Jk, Jy, Jm, and Jc by controlling a driving circuit 634 of the scanner unit 2. The exposure control unit 630 includes a synchronization unit 631, a light amount setting unit 632, and a masking unit 633. The synchronization unit 631 generates a horizontal synchronization signal (line synchronization signal) based on a BD signal outputted from the scanner unit 2. BD is an abbreviation for beam detection. The horizontal synchronization signal indicates a time interval (scanning period) for one line drawn in parallel with a main scanning direction. The BD signal can be outputted each time a reflecting mirror for reflecting the laser beam J is switched in a rotating polygon mirror provided in the scanner unit 2. The light amount setting unit 632 sets a setting value of a laser beam amount in the driving circuit 634. The driving circuit 634 drives the laser 635 such that the amount of light corresponds to the setting value. The masking unit 633 outputs a masking signal, which is used to inhibit the output of an image signal to the scanner unit 2 or to switch a light amount setting value, to the driving circuit 634. If the masking signal is at a High level, the driving circuit 634 stops the emission of the laser 635. If the masking signal is at a Low level, the driving circuit 634 drives the laser 635 so as to output the amount of light of the laser beam J that has been set by the light amount setting unit 632. One scanning period of the laser beam is divided into an image region and a non-image region. The masking signal primarily permits emission of the laser 635 in the image region and prohibits emission (stops emission) of the laser 635 in the non-image region.

The exposure control unit 630 receives an image signal one line at a time from the image signal generation unit 621 in synchronization with the line synchronization signal and transfers the image signal to the driving circuit 634. The driving circuit 634 causes the laser 635 to output the laser beams Jk, Jy, Jm, and Jc according to an output value of the image signal. As a result, the laser beams Jk, Jy, Jm, and Jc are emitted to the corresponding photosensitive drums Dk, Dy, Dm, and Dc, respectively.

A detection unit 640 detects the size (e.g., length and width) of a sheet S based on a detection signal outputted from the size sensor 11 and outputs size information to an error determination unit 610. The detection unit 640 detects the type of a sheet S based on a detection signal outputted from the media sensor 12 and outputs type information to the error determination unit 610.

The error determination unit 610 determines an error based on sheet information (size information and type information) outputted from the detection unit 640 and bonding information. The error refers to there being a sheet S for which it is difficult to perform bonding in the post-processing apparatus 300 from among a plurality of sheets S constituting a booklet. Such a sheet S can cause detachment in a booklet. Therefore, if such a sheet S is found, the CPU 501 interrupts thermocompression bonding of a booklet and reports an error to the user.

A communication unit 650 communicates with a communication unit 670 of the finisher control unit 550. For example, the communication unit 650 transmits sheet information and bonding information to the finisher control unit 550 or receives information related to the post-processing apparatus 300 from the finisher control unit 550. The communication unit 650 can be a communication circuit incorporated in the CPU 501.

The finisher control unit 550 includes a bonding control unit 680 and the communication unit 670. The bonding control unit 680 heats the heater 401 of the thermocompression bonding unit 51 and, by driving the motor M8, causes the thermocompression bonding unit 51 to bond a sheet bundle W by thermocompression. The communication unit 670 receives sheet information and bonding information from the printer control unit 500 and transmits information related to the post-processing apparatus 300 to the printer control unit 500.

(7) Error Determination Unit (7-1) Functions Realized by CPU

Figure 7:
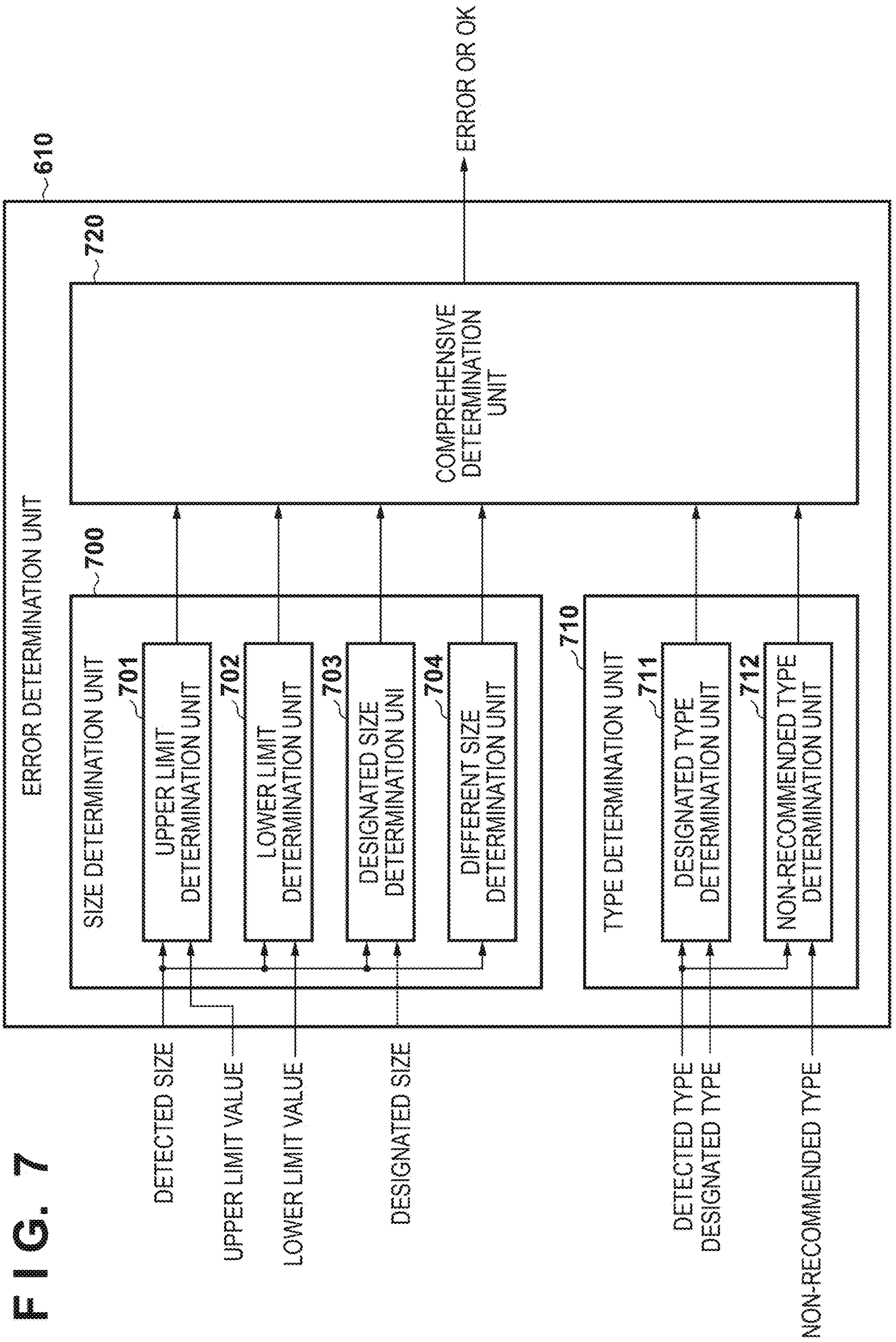
FIG. 7 is a diagram illustrating an error determination unit.

FIG. 7 illustrates the error determination unit 610 in detail. The error determination unit 610 includes a size determination unit 700, a type determination unit 710, and a comprehensive determination unit 720. The size determination unit 700 determines an error related to a sheet S. An upper limit determination unit 701 determines whether the size (detected size) of a sheet S detected by the size sensor 11 is less than or equal to an upper limit value held in a ROM region of the memory 502. If the detected size of a sheet S exceeds the upper limit value, it is determined that there is an error for that sheet S. If the detected size of a sheet S is less than or equal to the upper limit value, that sheet S is determined to be OK.

A lower limit determination unit 702 determines whether a detected size is greater than or equal to a lower limit value stored in the ROM region of the memory 502. If the detected size of a sheet S is less than the lower limit value, it is determined that there is an error for that sheet S. If the detected size of a sheet S is greater than or equal to the lower limit value, that sheet S is determined to be OK.

A designated size determination unit 703 determines whether a detected size matches a size (designated size) designated by the user. If the detected size of a sheet S does not match the designated size, it is determined that there is an error for that sheet S. If the detected size of a sheet S matches the designated size, that sheet S is determined to be OK. The detected size and the designated size need not be a complete match. For example, if an error between the designated size and the detected size is within a predetermined range, it is determined that the detected size matches the designated size.

A different size determination unit 704 compares the detected sizes of a plurality of sheets S constituting a booklet and determines whether the sizes of the plurality of sheets S are all the same size. If the sizes of the plurality of sheets S are all the same size, it is determined that there are no errors (OK). If there are a plurality of different sizes from among the sizes of the plurality of sheets S, there is a possibility that alignment can fail, and so, it is determined that there is an error. The different size determination unit 704 compares a detected size inputted from the detection unit 640 with a maximum value and a minimum value of detected sizes stored in the memory 502. If the detected size exceeds the maximum value, the maximum value stored in the memory 502 is updated. If the detected size is less than the minimum value, the minimum value stored in the memory 502 is updated. Further, the different size determination unit 704 obtains a difference between the maximum value and the minimum value and, when the difference exceeds a threshold, determines that there is an error.

The type determination unit 710 determines whether the type of a sheet S is a type that is suitable for bonding. For example, when a type designated by the user (designated type) and a detected type outputted from the detection unit 640 match, the designated type determination unit 711 determines that it is OK. When a type designated by the user (designated type) and a detected type outputted from the detection unit 640 do not match, the designated type determination unit 711 determines that there is an error.

When a detected type is a type (non-recommended type) that is not suitable for bonding, a non-recommended type determination unit 712 determines that there is an error. When a detected type is not a non-recommended type, the non-recommended type determination unit 712 determines that it is OK.

The comprehensive determination unit 720 outputs an error signal when one of the upper limit determination unit 701, the lower limit determination unit 702, the designated size determination unit 703, the different size determination unit 704, the designated type determination unit 711, and the non-recommended type determination unit 712 outputs an error. The comprehensive determination unit 720 outputs an OK signal when all of the upper limit determination unit 701, the lower limit determination unit 702, the designated size determination unit 703, the different size determination unit 704, the designated type determination unit 711, and the non-recommended type determination unit 712 output OK.

(7-2) Flowchart

Figure 8:
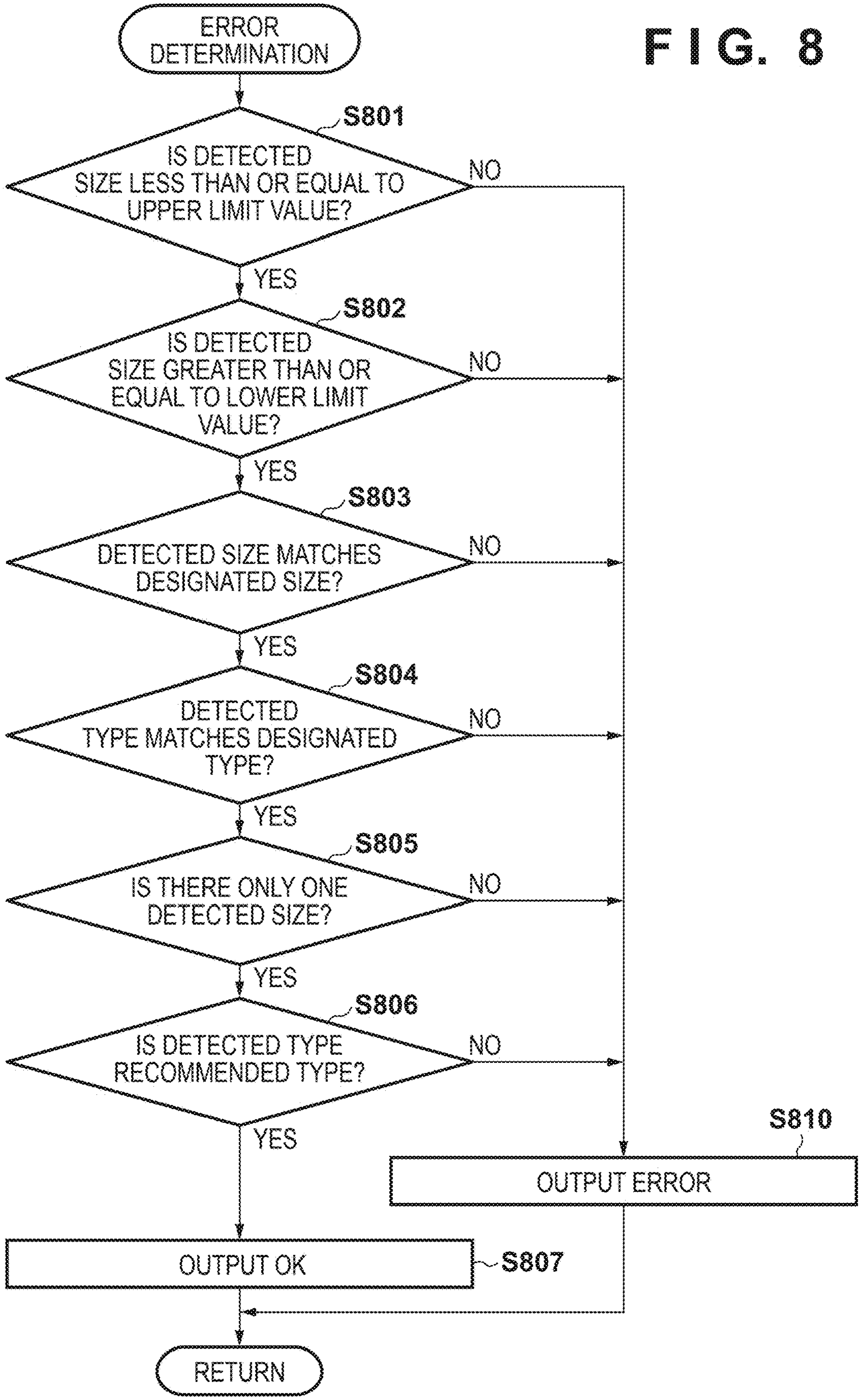
FIG. 8 is a flowchart for explaining an error determination method.

FIG. 8 illustrates an error determination method to be executed by the CPU 501 (error determination unit 610) according to a control program.

In step S801, the CPU 501 (upper limit determination unit 701) determines whether a detected size is less than or equal to an upper limit size. In the first embodiment, a maximum size that can be fed to the intermediate stack section 42 is the upper limit value. The upper limit value can be defined in both the Y direction (conveyance direction) and the X direction (width direction). The upper limit value in the Y direction is, for example, 297+α mm. The upper limit value in the X direction is, for example, 216+α mm. Here, a is a margin (e.g., 5 mm) that is set in view of a manufacturing error of a sheet S and a detection error of the size sensor 11. If the detected size exceeds the upper limit value in either the Y direction or the X direction, the CPU 501 determines that there is an error and proceeds from step S801 to step S810. If the detected size is less than or equal to the upper limit value in both the Y direction and the X direction, the CPU 501 determines that it is OK and proceeds from step S801 to step S802. For example, if a legal size (length in the Y direction=356 mm) for which an image can be formed is detected in the image forming apparatus 100, the CPU 501 determines that there is an error.

In step S802, the CPU 501 (lower limit determination unit 702) determines whether the detected size is less than or equal to the lower limit value. In the first embodiment, a minimum size that can be fed to the intermediate stack section 42 is the lower limit value. The lower limit value in the Y direction is, for example, 210−α mm. The lower limit value in the X direction is, for example, 148−α mm. If the detected size is less than the lower limit value in either the Y direction or the X direction, the CPU 501 determines that there is an error and proceeds from step S802 to step S810. If the detected size is greater than or equal to the lower limit value in both the Y direction and the X direction, the CPU 501 determines that it is OK and proceeds from step S802 to step S803.

In step S803, the CPU 501 (designated size determination unit 703) determines whether the detected size matches a designated size. When comparing the detected size and the designated size, the above-described margin a can be considered. This comparison can also be executed in both the Y direction and the X direction. If the detected size matches the designated size, the CPU 501 proceeds from step S803 to step S804. If the detected size does not match the designated size, the CPU 501 proceeds from step S803 to step S810. If sheet information does not include a designated size, the CPU 501 can determine that the detected size matches a designated size.

In step S804, the CPU 501 (designated type determination unit 711) determines whether a detected type matches a designated type. If the detected type does not match the designated type, the CPU 501 proceeds from step S804 to step S810. If the detected type matches the designated type, the CPU 501 proceeds from step S804 to step S805.

In step S805, the CPU 501 (different size determination unit 704) determines whether there is only one detected size. It is assumed that the sizes of a plurality of sheets S constituting a booklet match. Therefore, if a different size is included in the sizes of a plurality of sheets S constituting a booklet, the CPU 501 proceeds from step S805 to step S810. If the sizes of a plurality of sheets S constituting a booklet are only one size, the CPU 501 proceeds from step S805 to step S806. As described above, the different size determination unit 704 can obtain a difference between a maximum value and a minimum value of detected sizes and determine whether the difference exceeds a threshold. The threshold is set to, for example, 2×α mm.

In step S806, the CPU 501 (non-recommended type determination unit 712) determines whether the detected type is a recommended type. The CPU 501 can determine whether the detected type is a non-recommended type. The non-recommended type is, for example, an OHP sheet and the like. A projector projects an OHP sheet on a screen one at a time. Therefore, an OHP sheet is unlikely to be included in a booklet. An OHP sheet is only one example of the non-recommended type. The recommended type or the non-recommended type is set according to the constraints of the thermocompression bonding unit 51 and the characteristics of the bonding toner Tk. If the detected type is the recommended type, the CPU 501 proceeds to step S807. If the detected type is the non-recommended type, the CPU 501 proceeds to step S810.

In step S807, the CPU 501 outputs OK.

In step S810, the CPU 501 outputs an error. In this case, the CPU 501 can set an error history (e.g., flag) stored in the memory 502 to 1.

All of steps S801 to S806 are only one example. At least one of steps S801 to S806 can be adopted, or another determination target and determination criterion can be adopted.

(8) Operation for Printing Sheet Bundle

Figure 9:
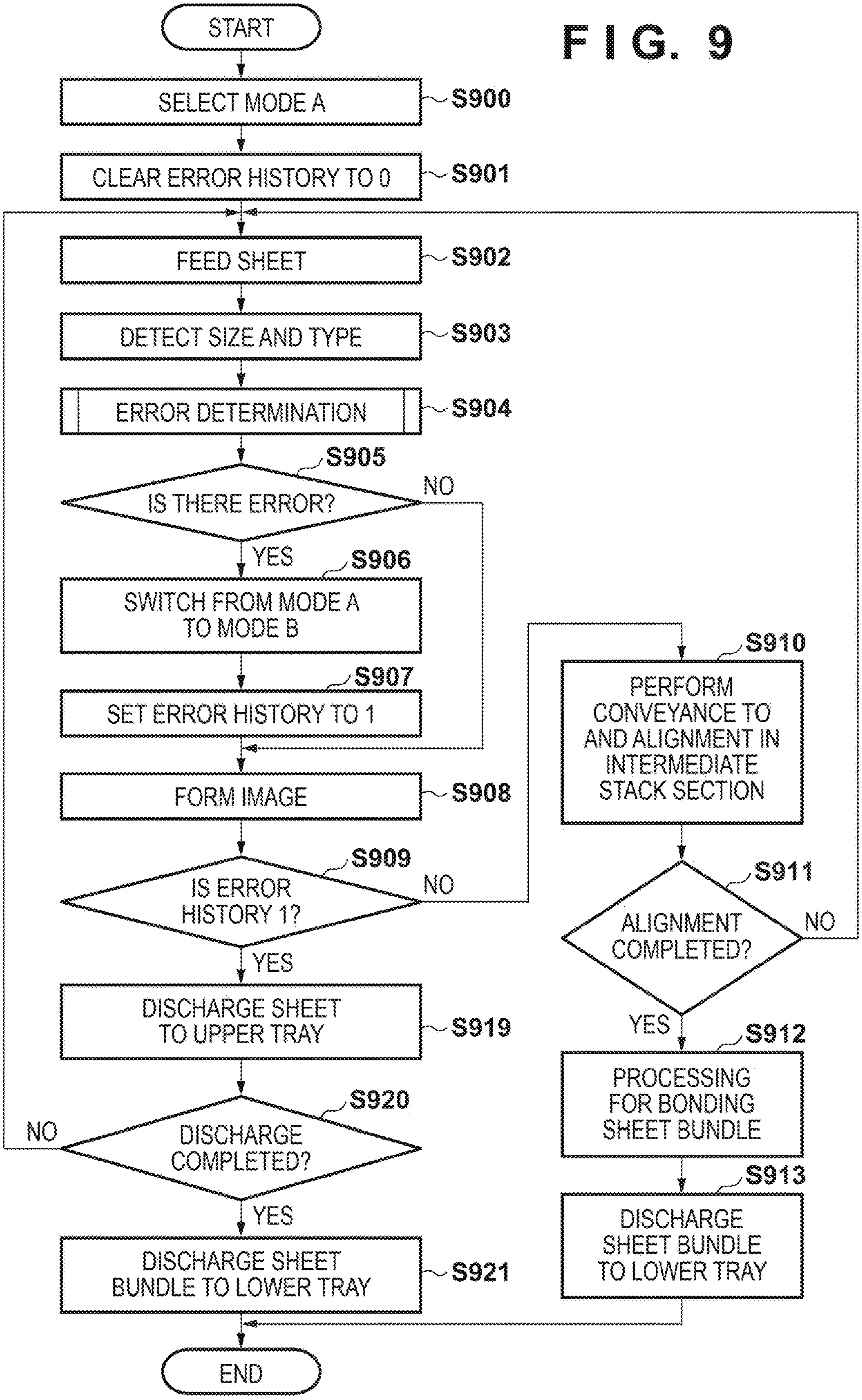
FIG. 9 is a flowchart for explaining a print operation.

FIG. 9 illustrates a print operation to be executed by the CPU 501 according to a control program.

In step S900, the CPU 501 (job control unit 620) selects mode A. Mode A is image forming mode in which both a user image and a bonding image are formed on a sheet S.

In step S901, the CPU 501 (job control unit 620) clears the error history stored in the memory 502 to 0.

In step S902, the CPU 501 (job control unit 620) starts feeding a sheet S by outputting a feeding start signal to the feeding unit 506. As a result, the feeding roller 81 feeds a sheet S stored in the sheet cassette 8 to a conveyance path, and the pair of conveyance rollers 82 conveys the sheet S further downstream.

In step S903, the CPU 501 (detection unit 640) detects the size and the type of the sheet S using the size sensor 11 and the media sensor 12.

In step S904, the CPU 501 (error determination unit 610) executes error determination based on a detection result outputted from the detection unit 640. The error determination is as described with reference to FIGS. 7 and 8.

In step S905, the CPU 501 (job control unit 620) determines whether there is an error based on a determination result. If there are no errors, the CPU 501 proceeds from step S905 to step S908. If there is an error, the CPU 501 proceeds from step S905 to step S906.

In step S906, the CPU 501 (job control unit 620) switches the image forming mode from mode A to mode B. Mode B is image forming mode in which a user image is formed on a sheet S and a bonding image is not formed on the sheet S.

In step S907, the CPU 501 (job control unit 620) sets the error history stored in the memory 502 to 1.

In step S908, the CPU 501 (job control unit 620) forms an image by controlling the image forming unit 10. The image forming unit 10 transfers a user image onto the sheet S and also transfers a bonding image as necessary. The fixing device 6 fixes the toner image onto the sheet S. Then, the sheet S is discharged to the post-processing apparatus 300.

In step S909, the CPU 501 (job control unit 620) reads the error history from the memory 502 and determines whether the error history is 1. If the error history is 1, the CPU 501 proceeds from step S909 to step S919. If the error history is not 1, the CPU 501 proceeds from step S909 to step S910.

(8-1) If there are No Errors

A booklet is formed of M sheets S. If there are no errors in any of the M sheets S, a user image and a bonding image are formed on each sheet S according to mode A. If an error is detected in an i-th sheet Si, mode A is applied from the first sheet S1 to an I−1-th sheet Si−1. Mode B is applied from the i-th sheet Si to an M-th sheet SM, and only a user image is formed.

In step S910, the CPU 501 (job control unit 620) conveys the sheet S to the intermediate stack section 42 and causes the intermediate stack section 42 to execute the alignment operation by controlling the post-processing apparatus 300 via the CPU 551 (bonding control unit 680).

In step S911, the CPU 501 determines whether all the sheets S forming a booklet (sheet bundle W) have been aligned according to whether a complete signal indicating completion of the alignment operation has been received from the CPU 551. If the alignment is not completed, the CPU 501 returns from step S911 to step S902. Meanwhile, when it is determined that there are no errors for all of the sheets S and the alignment is completed, the CPU 501 proceeds from step S911 to step S912.

In step S912, the CPU 501 executes processing for bonding the sheet bundle W (booklet) by controlling the thermocompression bonding unit 51 via the CPU 551 (bonding control unit 680).

In step S913, the CPU 501 discharges the sheet bundle W (completed booklet) to the lower tray 37 by controlling the intermediate stack section 42 via the CPU 551 (bonding control unit 680).

(8-2) If There Is Error

For example, when an error is detected in the i-th sheet Si, the image forming mode is switched from mode A to mode B. That is, a bonding image is not formed from the i-th sheet Si to the M-th sheet SM.

In step S919, the CPU 501 discharges the sheet S to the upper tray 25 by controlling the post-processing apparatus 300 via the CPU 551. That is, the i-th sheet Si to the M-th sheet SM are stacked on the upper tray 25.

In step S920, the CPU 501 determines whether sheets S have been discharged to the upper tray 25. For example, when the i-th sheet Si to the M-th sheet SM are discharged to the upper tray 25, the CPU 501 proceeds from step S920 to step S921. If the sheets S have not been discharged to the upper tray 25, the CPU 501 proceeds from step S920 to step S902.

In step S921, the CPU 501 discharges a sheet bundle (incomplete booklet) held in the intermediate stack section 42 to the lower tray 37 by controlling the intermediate stack section 42 via the CPU 551. The intermediate stack section 42 can discharge the sheet bundle to the lower tray 37 after executing bonding processing on the sheet bundle.

(9) Image Forming Mode

Figure 10A:
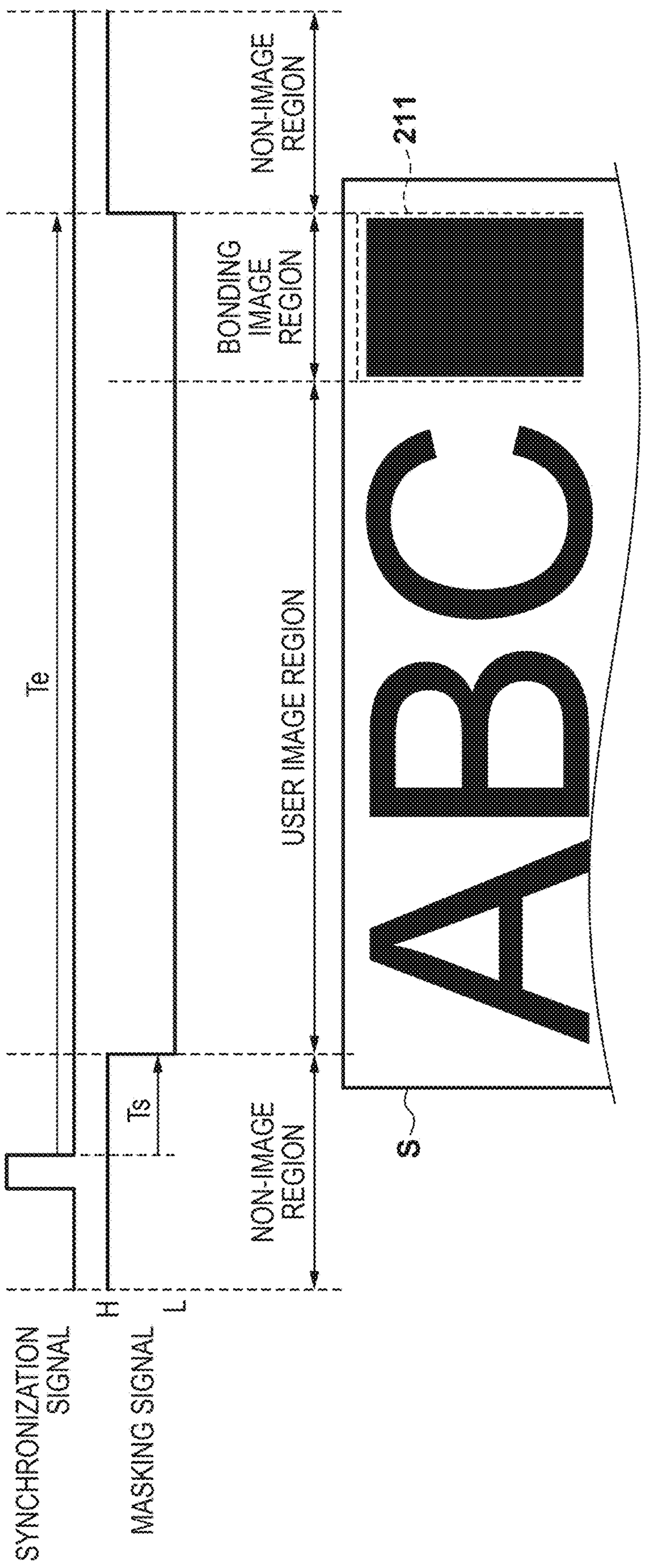
FIGS. 10A and 10B are diagrams illustrating a relationship between a masking signal and a bonding image.
Figure 10B:
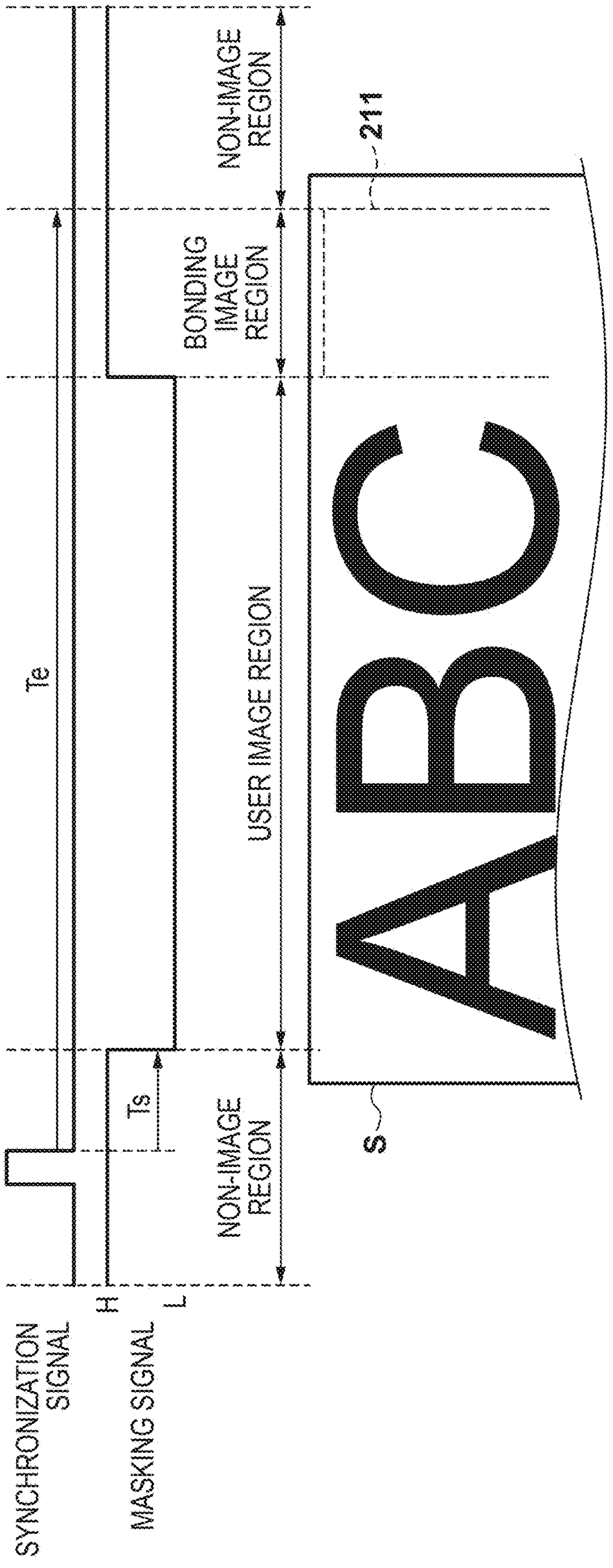

FIG. 10A is a diagram for explaining mode A. FIG. 10B is a diagram for explaining mode B.

As illustrated in FIG. 10A, when a period Ts has elapsed from a timing at which the synchronization signal was switched from High to Low, the masking unit 633 switches the masking signal from High to Low. As a result, emission of the laser 635 is permitted. When the exposure of a bonding image is completed, the masking unit 633 switches the masking signal from Low to High. As a result, emission of the laser 635 is prohibited (emission is stopped). A timing at which the masking signal is switched from Low to High is a timing at which a period Te has elapsed from a timing at which the synchronization signal was switched from High to Low. As a result, a user image and a bonding image are formed.

As illustrated in FIG. 10B, also in mode B, a period Ts corresponding to an emission permission timing is similar to the period Ts of mode A. However, the masking signal is switched from Low to High according to a timing at which to start exposure of a bonding image. As a result, the driving circuit 634 stops the emission of the laser 635. As a result, a user image is formed, but a bonding image is not formed.

According to the first embodiment, an error for the processing for bonding a sheet bundle W is determined or detected based on sheet information. If there are no errors, a user image and a bonding image are formed on a sheet S, and the sheet bundle W is subjected to the bonding processing. If there is an error, the processing for bonding the sheet bundle W is not executed. That is, only a user image is formed on the sheet S, and a bonding image is not formed. As a result, printing is continued even when the processing for bonding the sheet bundle W is not performed, but a consumption amount of the bonding toner Tk is reduced.

The switch between forming and not forming a bonding image illustrated in FIGS. 10A and 10B is only one example. An image signal transmitted from the image signal generation unit 621 to the scanner unit 2 includes both a user image and a bonding image. Any method can be adopted so long as it is possible to switch between a mode in which a user image and a bonding image are formed and a mode in which only a user image is formed for the image signal.

In the first embodiment, when an error is detected, a bonding image is not formed in order to reduce the consumption amount of the bonding toner Tk. However, this is only one example. The consumption amount of the bonding toner Tk for when an error is detected need only be reduced from the consumption amount of the bonding toner Tk for when an error is not detected. As a result, a bonding image is formed at a relatively low density.

Figure 11A:
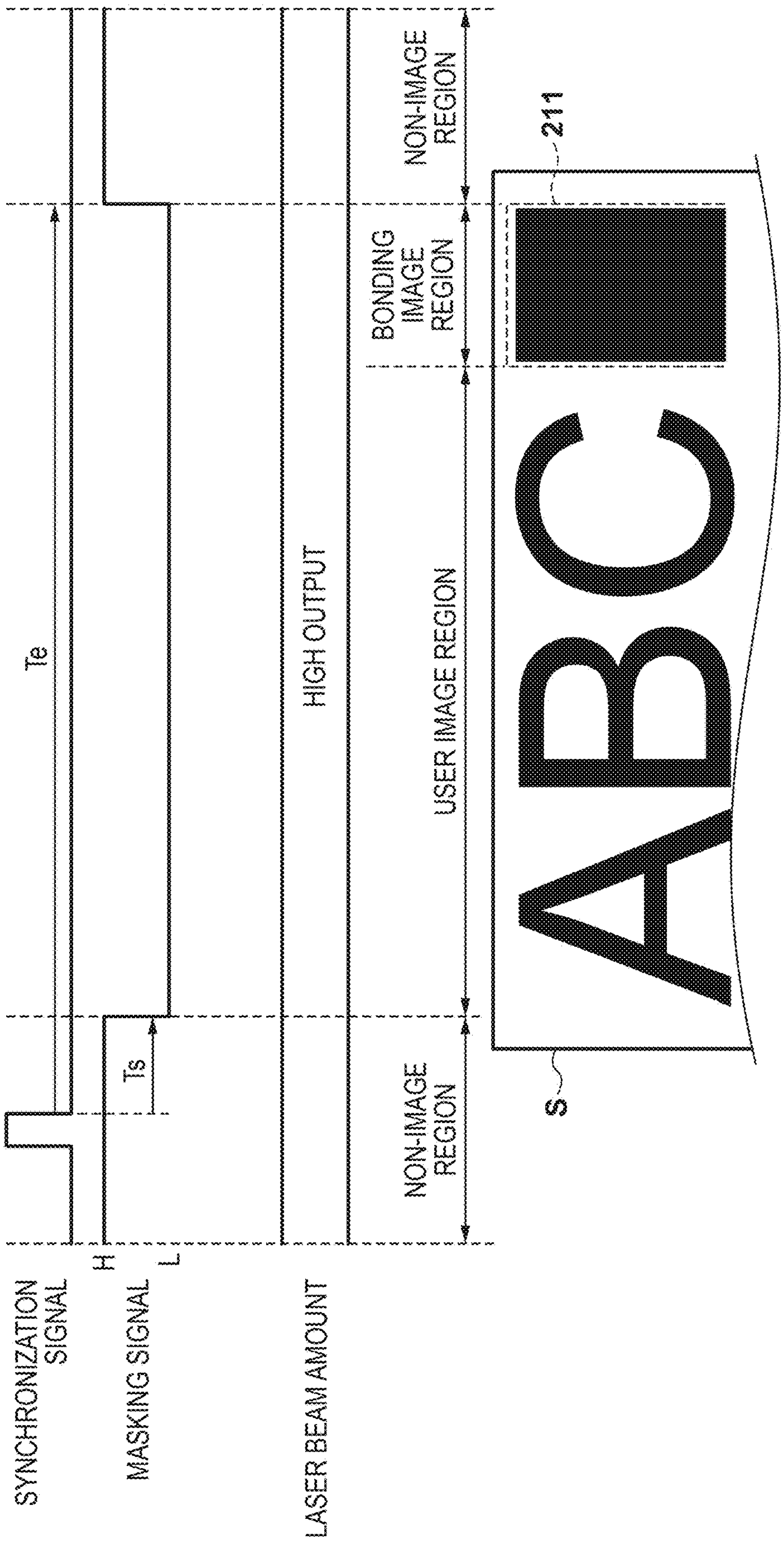
FIGS. 11A and 11B are diagrams illustrating a relationship between a light amount setting value and a bonding image.
Figure 11B:
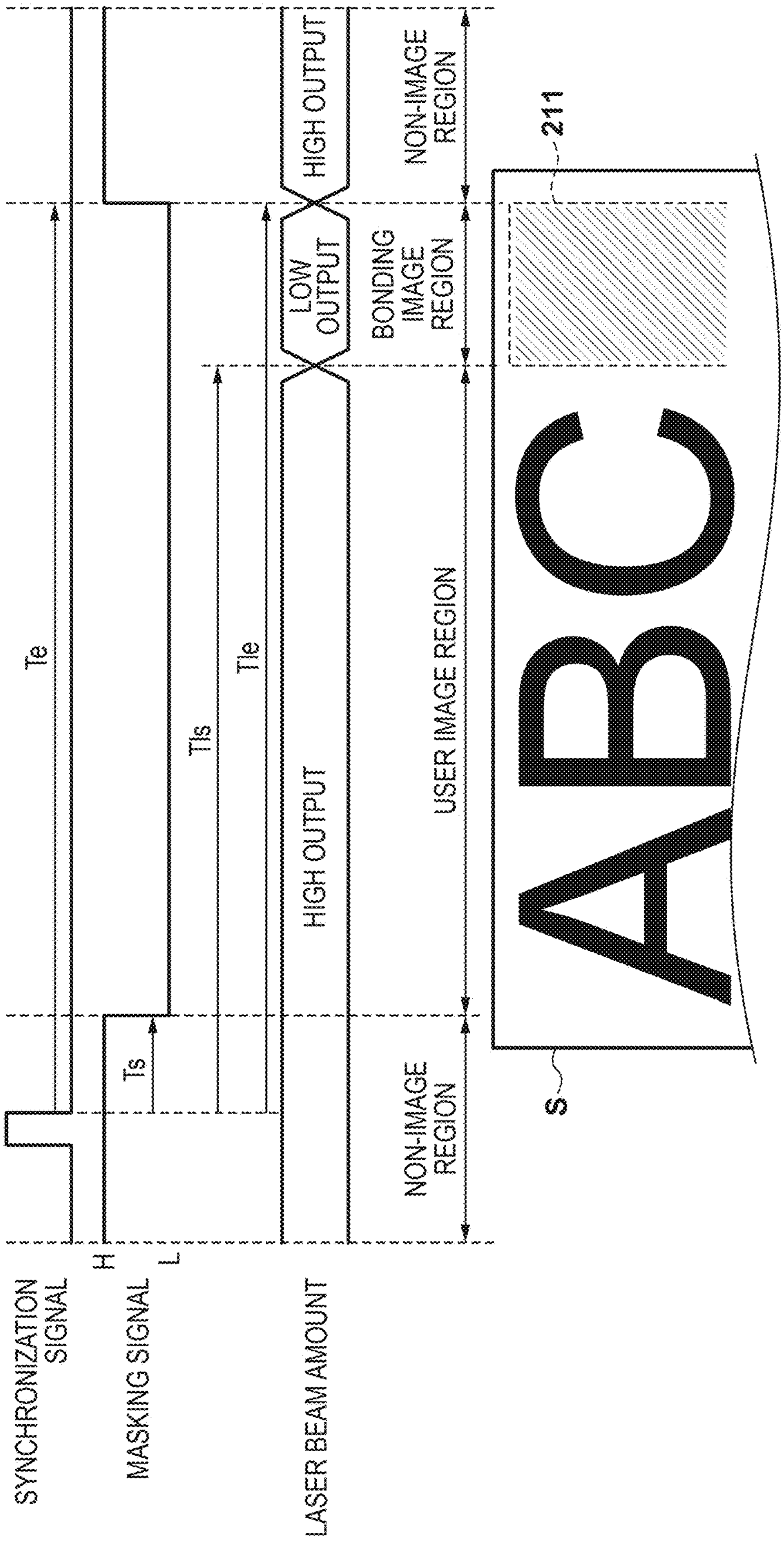

FIG. 11A illustrates a setting value of the laser beam amount in mode A. FIG. 11B illustrates a setting value of the laser beam amount in mode C, which is adopted in place of mode B. As illustrated in FIG. 11A, in mode A, the laser beam amount is always set to high output.

As illustrated in FIG. 11B, in mode C, the laser beam amount is set to high output in a non-image region and a user image region. Meanwhile, in a bonding image region, the laser beam amount is set to low output. The light amount setting unit 632 generally sets the laser beam amount to high output. When a period Tls has elapsed from a timing at which the synchronization signal is switched to Low, the light amount setting unit 632 sets the laser beam amount to low output. Further, when a period Tle has elapsed from a timing at which the synchronization signal is switched to Low, the light amount setting unit 632 sets the laser beam amount to high output. The density of a bonding image formed in the printing region 211 of FIG. 11B is lower than the density of a bonding image formed in the printing region 211 of FIG. 11A. That is, when an error is detected, the consumption amount of the bonding toner Tk is reduced.

A bonding image is also formed on a sheet S to be discharged to the upper tray 25 without the bonding processing being performed by the thermocompression bonding unit 51. The user can bind a plurality of sheets S discharged to the upper tray 25 using glue or a stapler. At this time, a low-density bonding image formed on a sheet S to be discharged to the upper tray 25 can be utilized as a gluing margin for the user to apply glue. Alternatively, a low-density bonding image can be used as a guide for a position at which to perform stapling using a stapler. As described above, a low-density bonding image makes it possible to reduce the consumption amount of the bonding toner Tk and indicate a bonding position to the user.

Second Embodiment (1) Basic Concept

In the first embodiment, the error determination unit 610 is realized by the CPU 501, but in the second embodiment, the error determination unit 610 can be realized by the CPU 551. In the first embodiment, error determination is executed based on detection results of the size sensor 11 and the media sensor 12. In the second embodiment, error determination is executed based on a result of the sheet sensor 27 provided in the post-processing apparatus 300. In the second embodiment, the description of the first embodiment is invoked for the description of matters common to or similar to the first embodiment.

(2) Functions Realized by CPUs

Figure 12:
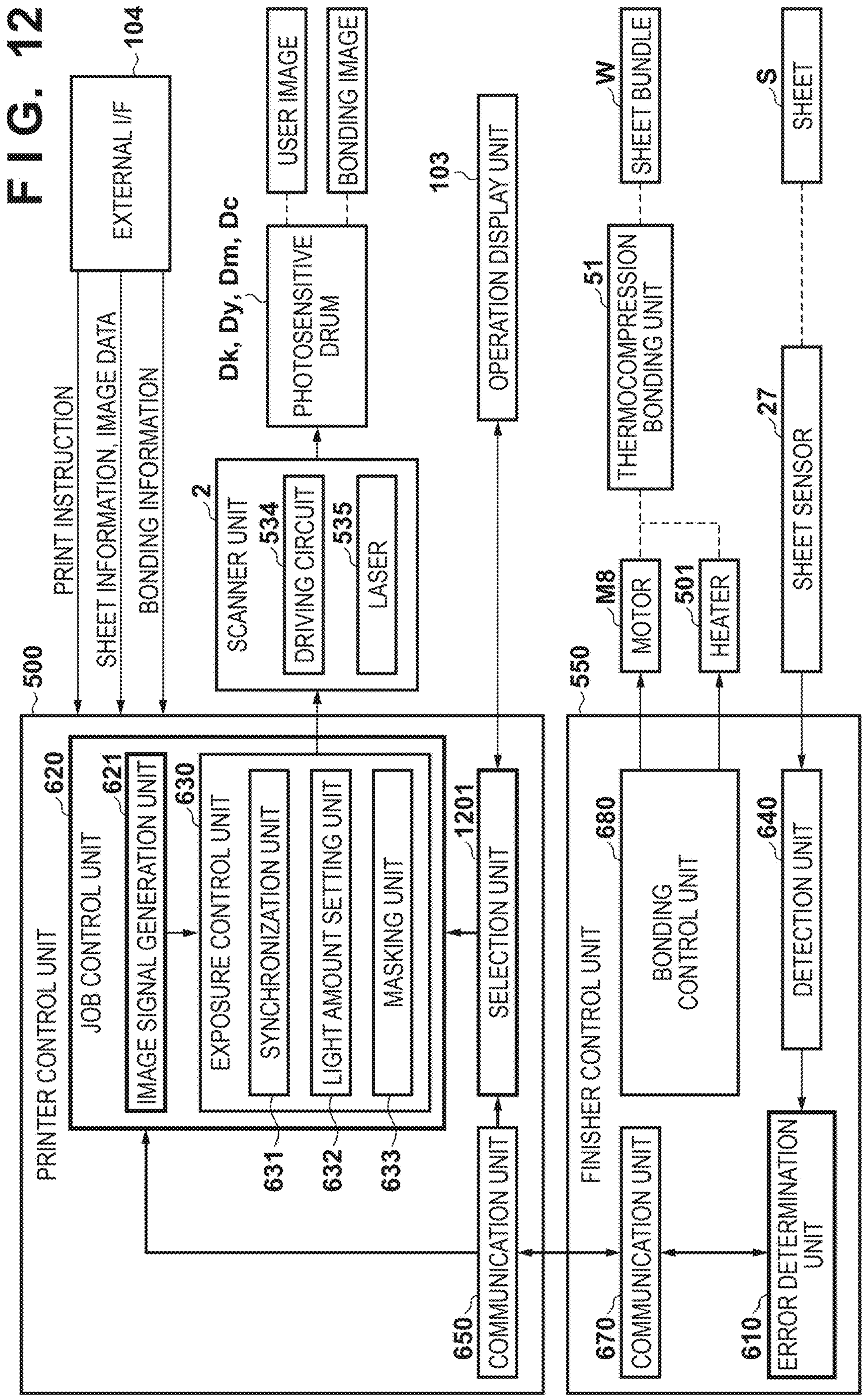
FIG. 12 is a diagram illustrating functions of control units.

FIG. 12 illustrates functions implemented in the printer control unit 500 and the finisher control unit 550 according to the second embodiment.

The error determination unit 610 and the detection unit 640 are arranged in the finisher control unit 550. The detection unit 640 determines the size (length in at least the conveyance direction) of a sheet S based on a detection result of the sheet sensor 27 and outputs size information including the detected size to the error determination unit 610. The error determination unit 610 determines whether there is an error based on the detection result (detected size) of the sheet sensor 27. The error determination unit 610 transmits a determination result to the printer control unit 500 via the communication unit 670.

The image signal generation unit 621 receives the determination result of the error determination unit 610 provided in the finisher control unit 550 via the communication units 650 and 670. The image signal generation unit 621 switches the image forming mode according to an error determination result. For example, the image signal generation unit 621 can switch image data for forming a bonding image according to the error determination result.

Figure 13A:
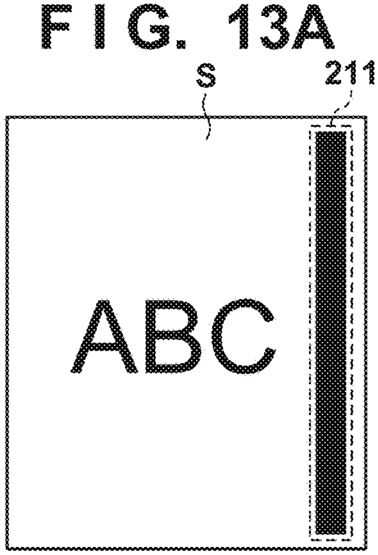
FIGS. 13A to 13E are diagrams illustrating a bonding image.

FIG. 13A illustrates a bonding image for when errors are not detected and the bonding information includes a long-side binding designation. A bonding image is formed in black in the printing region 211.

Figure 13B:
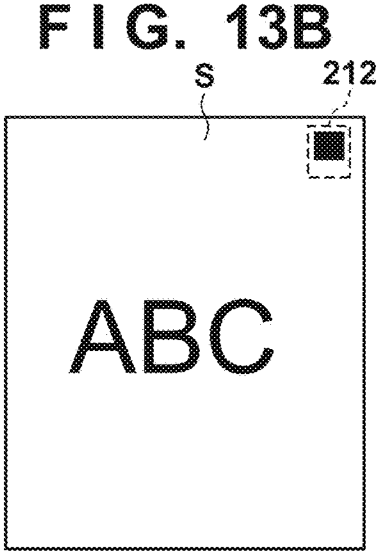

FIG. 13B illustrates a bonding image for when errors are not detected and the bonding information includes a corner binding designation. A black image is formed in the printing region 212 for corner binding. The black image need not be a solid image. The amount of toner applied in the black image need only be an amount at which the black image sufficiently functions as a bonding agent.

Figure 13C:
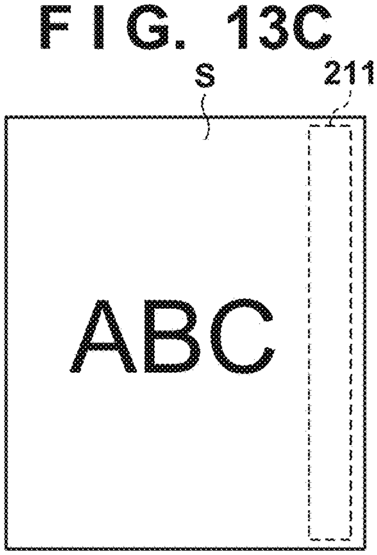

FIG. 13C illustrates a bonding image for when an error is detected and the bonding information includes a long-side binding designation. A bonding image is not formed in the printing region 211.

Figure 13D:
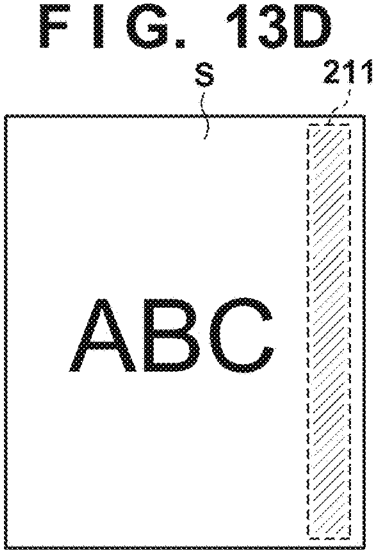

FIG. 13D illustrates a bonding image for when an error is detected and the bonding information includes a long-side binding designation. A low-density bonding image is formed in the printing region 211.

Figure 13E:
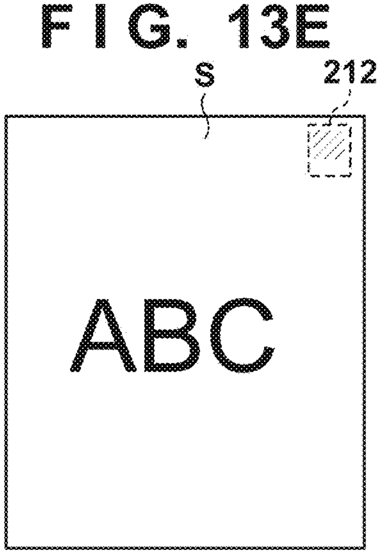

FIG. 13E illustrates a bonding image for when an error is detected and the bonding information includes a corner binding designation. A low-density black image is formed in the printing region 212 for corner binding. As described above, the image signal generation unit 621 generates image data for a bonding image based on the error determination result and the bonding information.

Also in the second embodiment, when the error determination unit 610 detects an error, the processing for bonding the sheet bundle W need not be applied. However, a bonding image can indicate to the user a bonding position for when binding the sheet bundle W using glue or a stapler.

In FIGS. 13D and 13E, the bonding images are hatched images, but this is only one example. A bonding image need only be able to indicate to the user a bonding position on a sheet S. Further, the image need only be such that the consumption amount of toner can be reduced. As described in the first embodiment, the image signal generation unit 621 generates combined image data by overlapping image data of a user image and image data for a bonding image.

As illustrated in FIG. 12, a selection unit 1201 selects whether to continue image formation when the error determination unit 610 detects an error and outputs a selection result to the job control unit 620. The selection unit 1201 can display a query message on the operation display unit 103 and accept the use's selection. The query message includes a message for querying the user whether to continue image formation. The selection unit 1201 selects whether or not to continue image formation based on information inputted by the user via the operation display unit 103. For example, the display device of the operation display unit 103 displays a message““continue print operation when error occurs regarding bonding of sheets””. The user inputs““ye”” or ““n”” via the input device of the operation display unit 103. The selection unit 1201 stores an input result in the memory 502. If the error determination unit 610 detects an error and the user inputs ““ye””, the selection unit 1201 continues image formation. When ““n”” is inputted, the selection unit

1201 does not continue image formation. An initial value stored in the memory 502 is an input value corresponding to ""ye"".

Incidentally, the sheet sensor 27 can be a reflection-type photosensor that determines whether there is a sheet S by irradiating the sheet S with light and receiving the reflected light thereof. The CPU 551 measures a period (period for which the sheet S is passing) for which light reflected off of the sheet S is continuously detected while the sheet S is being conveyed, using the timer 555. The detection unit 640 estimates the length of the sheet S based on a measurement result. The error determination unit 610 determines an error based on sheet information (detected size) detected by the detection unit 640 and the bonding information.

(3) Error Determination Unit

Figure 14:
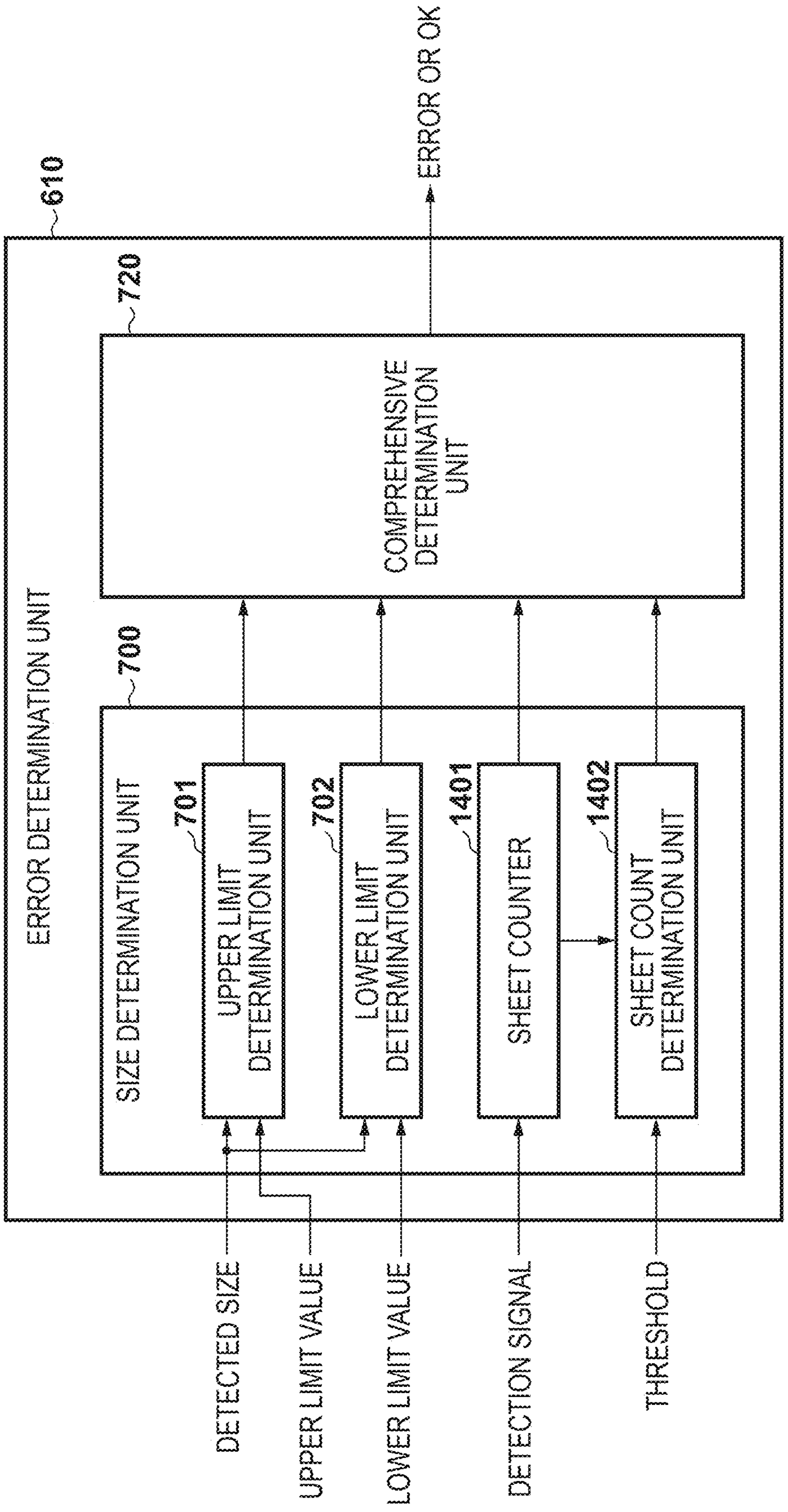
FIG. 14 is a diagram illustrating an error determination unit.

FIG. 14 illustrates the error determination unit 610 of the second embodiment. The size determination unit 700 includes, in addition to the upper limit determination unit 701 and the lower limit determination unit 702 described above, a sheet counter 1401 and a sheet count determination unit 1402. The upper limit determination unit 701 determines whether a detected size obtained by the sheet sensor 27 is less than or equal to an upper limit value. The upper limit value is stored in the memory 552. The lower limit determination unit 702 determines whether the detected size obtained by the sheet sensor 27 is greater than or equal to a lower limit value. The lower limit value is stored in the memory 552. A specific example for a method of determining these is as described in the first embodiment.

The sheet counter 1401 counts the number of sheets S conveyed from the image forming apparatus 100 to the post-processing apparatus 300. For example, the number of sheets S to be included in a booklet is counted. The sheet count determination unit 1402 determines whether a count value of the sheet counter 1401 is less than or equal to a threshold. The threshold indicates, for example, the number of sheets S that can be held in the intermediate stack section 42. That is, the threshold can be a maximum value of the number of sheets S that can be included in a booklet. If the count value exceeds the threshold, the sheet count determination unit 1402 outputs an error to the comprehensive determination unit 720. If the count value is less than or equal to the threshold, the sheet count determination unit 1402 outputs OK to the comprehensive determination unit 720.

Figure 15:
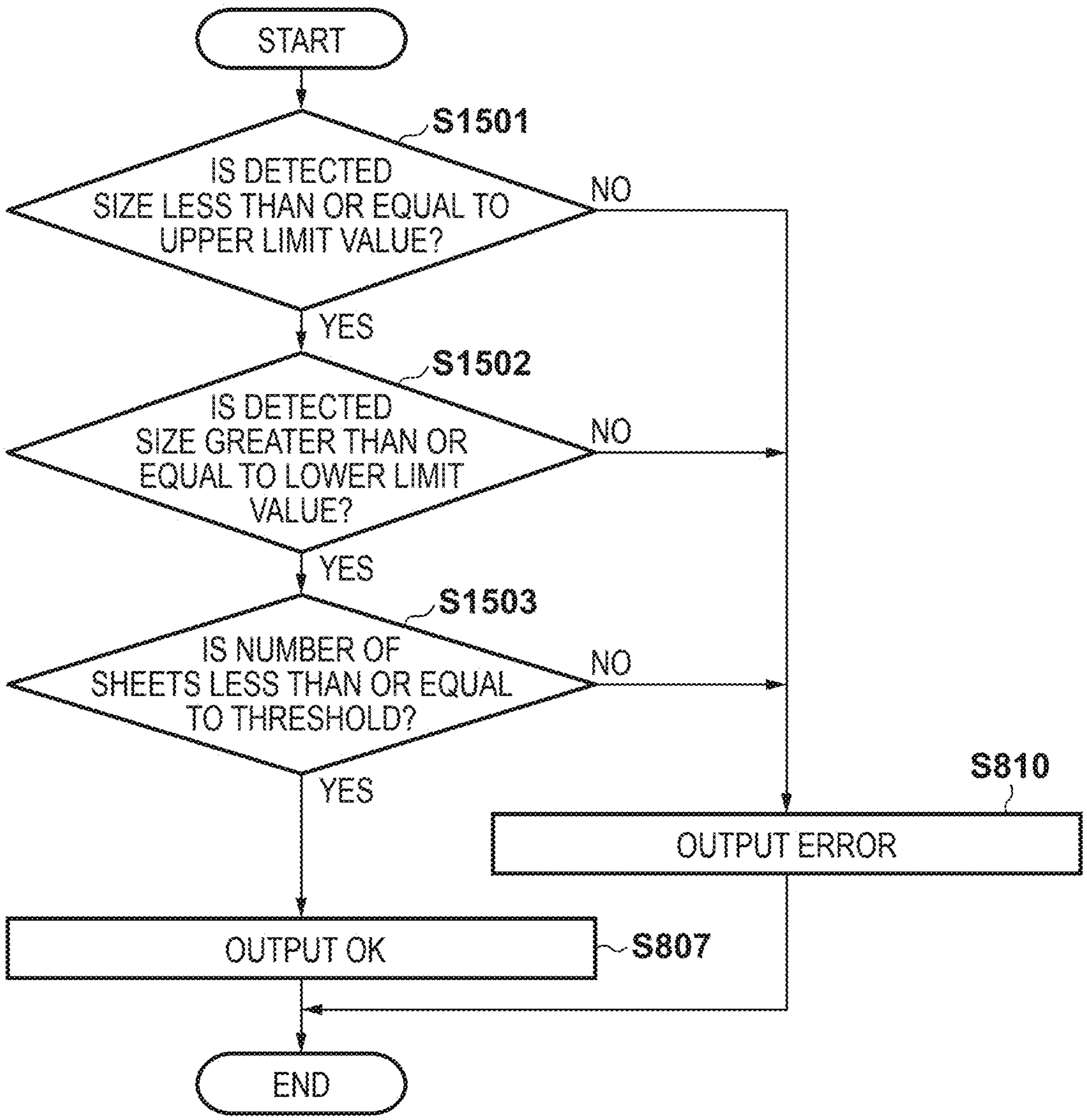
FIG. 15 is a flowchart for explaining an error determination method.

FIG. 15 illustrates error determination processing to be executed by the CPU 551.

In step S1501, the CPU 551 (upper limit determination unit 701) determines whether a detected size is less than or equal to an upper limit size. The sheet sensor 27 can detect the size of a sheet S in the Y direction but cannot detect the size in the X direction. Therefore, the detected size is the length of a sheet S in the Y direction. However, similarly to the size sensor 11, a sensor capable of detecting both the length in the Y direction and the length in the X direction can be adopted as the sheet sensor 27. In this case, steps S1501 and S1502 are processing similar to steps S801 and S802. If the detected size exceeds the upper limit value, the CPU 551 determines that there is an error and proceeds from step S1501 to step S810. If the detected size is less than or equal to the upper limit value, the CPU 551 determines that it is OK and proceeds from step S1501 to step S1502.

In step S1502, the CPU 501 (lower limit determination unit 702) determines whether the detected size is less than or equal to the lower limit value. If the detected size is less than the lower limit value, the CPU 501 determines that there is an error and proceeds from step S1502 to step S810. If the detected size is greater than or equal to the lower limit value, the CPU 501 determines that it is OK and proceeds from step S1502 to step S1503.

In step S1503, the CPU 501 (sheet count determination unit 1402) determines whether the number of sheets counted by the sheet counter 1401 is less than or equal to the threshold. If the number of sheets counted by the sheet counter 1401 is less than or equal to the threshold, the CPU 501 proceeds from step S1503 to step S807. If the number of sheets counted by the sheet counter 1401 is not less than or equal to the threshold, the CPU 501 proceeds from step S1503 to step S810.

The threshold is, for example, a maximum number of sheets S that can be bound at one time by the thermocompression bonding unit 51. The CPU 551 can change the threshold according to the type of sheets S. For example, the threshold for plain paper is 20 sheets. The threshold for thick paper is 10 sheets. A plurality of different types of sheets S can be included in the sheet bundle W. In this case, the threshold associated with the thickest type from among the plurality of types can be employed. For example, the threshold for a sheet bundle W in which plain paper and thick paper are mixed is set to 10 sheets. The CPU 551 can obtain a more accurate thickness of the sheet bundle W by weighting the number of sheets S according to the type of each sheet S constituting the sheet bundle W. For example, one sheet of plain paper can be counted as one sheet and one sheet of thick paper can be counted as two sheets. As described above, the count value of thick paper can be converted into the count value of the plain paper by weighting the count value of thick paper. As a result, the threshold set based on plain paper is compared with the count value.

(4) Print Operation (4-1) Processing in Printer Control Unit

Figure 16:
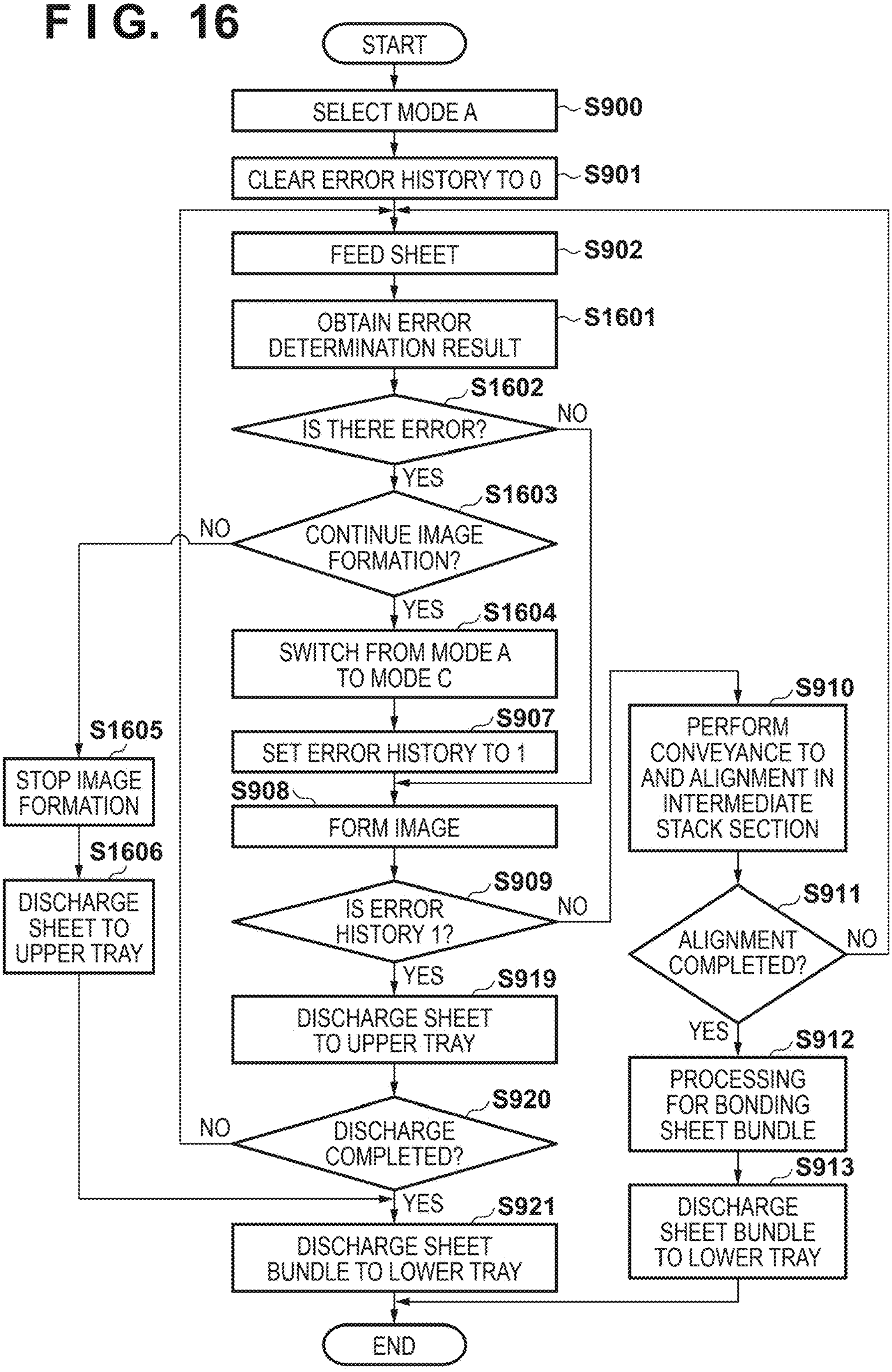
FIG. 16 is a flowchart for explaining a print operation.

FIG. 16 illustrates processing to be executed by the CPU 501 in the second embodiment. A point of difference between FIG. 16 and FIG. 9 is that steps S903 to S906 are replaced with steps S1601 to S1606. The CPU 501 proceeds from step S902 to step S1601.

In step S1601, the CPU 501 (job control unit 620) obtains an error determination result from the finisher control unit 550.

In step S1602, the CPU 501 (job control unit 620) determines whether the error determination result includes an error. If there is an error, the CPU 501 proceeds from step S1602 to step S1603. If there are no errors, the CPU 501 proceeds from step S1602 to step S908.

In step S1603, the CPU 501 (selection unit 1201) determines whether to continue image formation. The selection unit 1201 determines whether to continue image formation, for example, based on input information from the operation display unit 103. In the case of continuing image formation, the CPU 501 proceeds from step S1603 to step S1604.

In step S1604, the CPU 501 (job control unit 620) switches the image forming mode from mode A to mode C. Mode C is only one example, and the image forming mode can be switched from mode A to mode B. Then, the CPU 501 proceeds from step S1604 to step S907.

If it is selected in step S1603 to not continue image formation, the CPU 501 proceeds from step S1603 to step S1605. In step S1605, the CPU 501 (job control unit 620) stops image formation by the image forming apparatus 100. In step S1606, the CPU 501 (job control unit 620) discharges the sheet S to the upper tray 25 by controlling the post-processing apparatus 300 via the CPU 551. Then, in step S921, the CPU 501 discharges a sheet bundle W held in the intermediate stack section 42 to the lower tray 37 by controlling the post-processing apparatus 300 via the CPU 551.

(4-2) Processing in Finisher Control Unit

Figure 17:
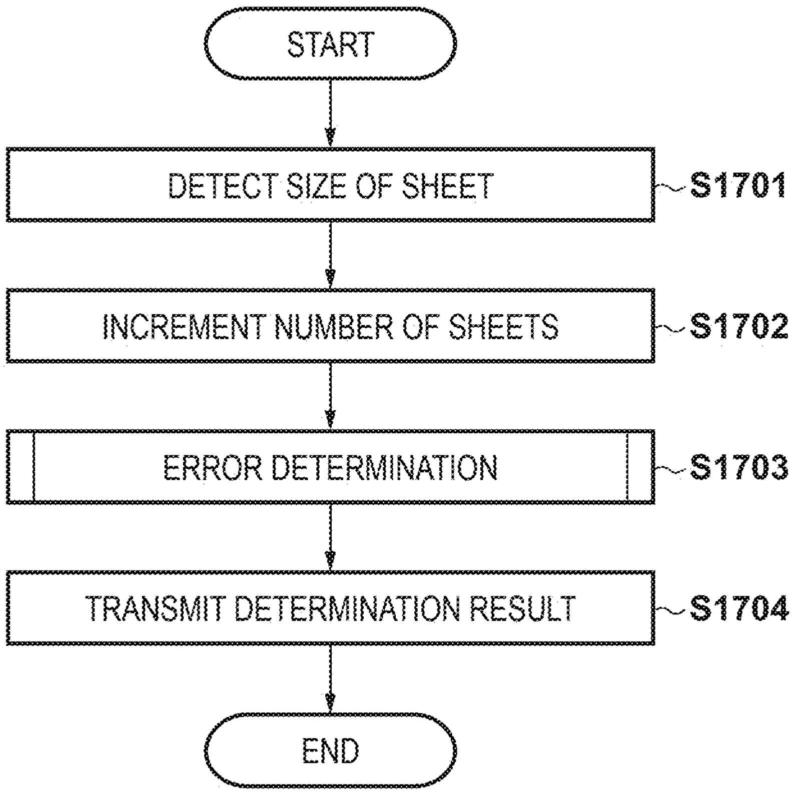
FIG. 17 is a flowchart for explaining processing of a finisher control unit.

FIG. 17 illustrates processing to be executed by the CPU 551. In step S1701, the CPU 551 (detection unit 640) detects the size of a sheet S using the sheet sensor 27 and the timer 555.

In step S1702, the CPU 551 (sheet counter 1401) increments the number of sheets S using the sheet sensor 27. The sheet counter 1401 increments the number of sheets S by one each time a sheet S passes through the sheet sensor 27. Such an incrementation method is only one example, and another method as described above can be employed.

In step S1703, the CPU 551 (error determination unit 610) executes error determination based on the detected size and the count value of the sheet counter 1401. The error determination has already been described in detail with reference to FIGS. 14 and 15.

In step S1704, the CPU 551 (error determination unit 610) transmits a determination result to the printer control unit 500 via the communication unit 670.

According to the second embodiment, it is determined whether there is an error related to bonding processing based on sheet information (e.g., detected size and the number of sheets S constituting a sheet bundle W). If there are no errors, a user image and a bonding image are formed on a sheet S. If there is an error, only a user image is formed and a bonding image is not formed or a bonding image is formed at a low density. As a result, the consumption amount of the bonding toner Tk is reduced.

As described above, when an error is detected, a bonding image (image indicating a bonding position) can be formed at a low density. In this case, it is easy for the user to visually identify a gluing margin or a margin for binding using the stapler. In addition, depending on a setting of the user, the print operation can be stopped when an error is detected. In some cases, the user does not wish to print an image on a sheet S to which bonding processing will not be applied. In this case, the print operation is stopped as desired by the user. As a result, unnecessary consumption of a sheet S and toner is reduced.

Other Embodiments

In the first embodiment, the error determination unit 610 is provided in the printer control unit 500. In the second embodiment, the error determination unit 610 is provided in the finisher control unit 550. As described above, the error determination unit 610 can be arranged in either the printer control unit 500 or the finisher control unit 550. Further, the error determination unit 610 can be implemented in both the printer control unit 500 and the finisher control unit 550.

Figure 18:
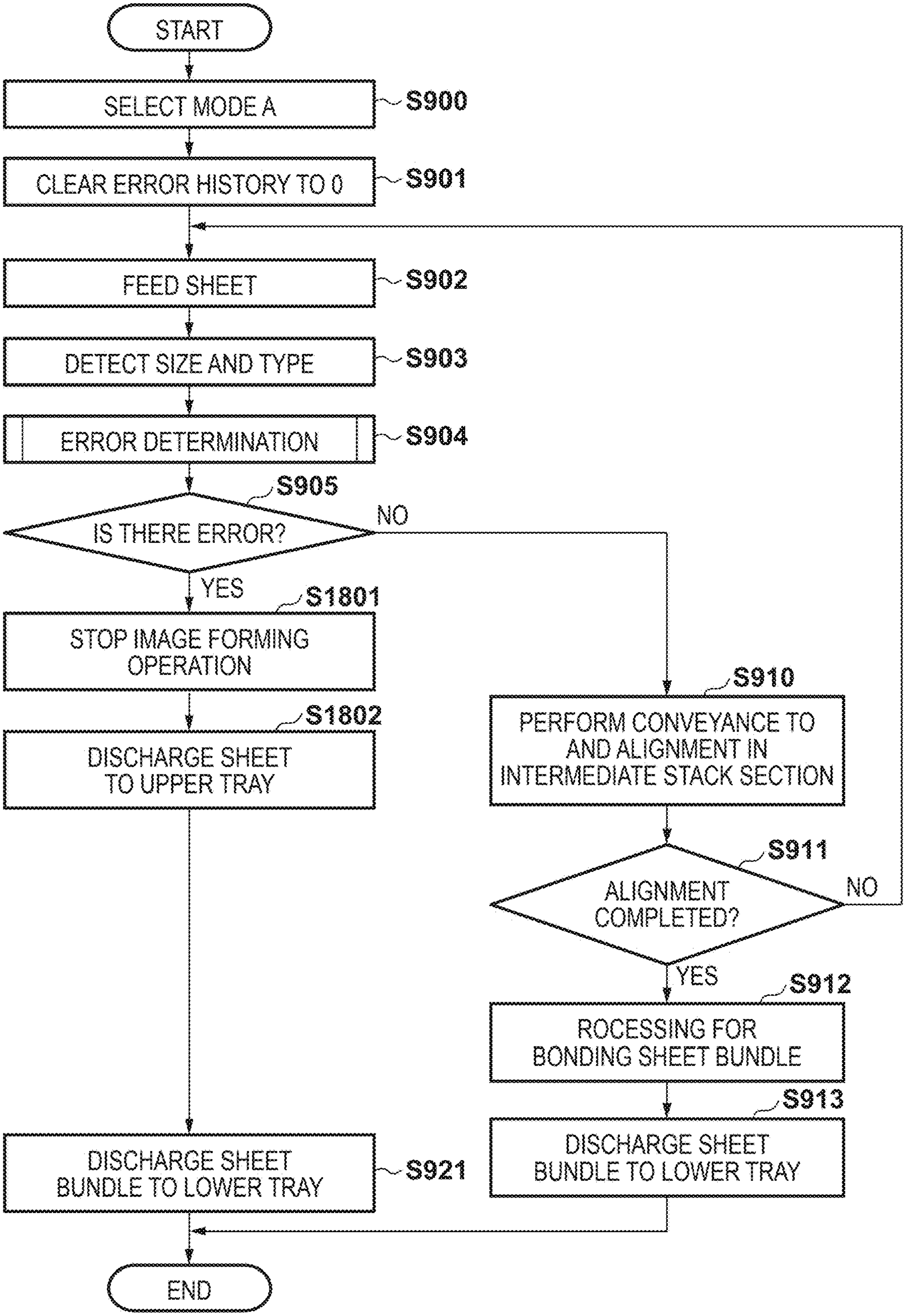
FIG. 18 is a flowchart for explaining a print operation.

When the error determination unit 610 detects an error, the image forming apparatus 100 can always stop an image forming operation. As illustrated in FIG. 18, when the error determination unit 610 detects an error, the CPU 501 proceeds from step S905 to step S1801.

In step S1801, the CPU 501 stops the image forming operation by the image forming apparatus 100. In step S1802, the CPU 501 discharges the sheet S for which it is determined that there is an error to the upper tray 25 by controlling the post-processing apparatus 300 via the CPU 551. Then, the CPU 501 proceeds from step S1802 to step S921.

Technical Concept Derived from Embodiments (Item 1)

As illustrated in FIGS. 2A and 2B and the like, the printing regions 211 and 212 are examples of binding margins for booklets. The thermocompression bonding unit 51 is an example of a bonding unit. As described with reference to FIGS. 7 and 8, a constraint related to a size and a constraint related to a type of sheet S are examples of a condition for enabling bonding. A density of a bonding image of a sheet S that does not satisfy the condition for enabling bonding is reduced. That is, a consumption amount of a powder bonding agent (e.g., bonding toner Tk) used for a bonding image for producing a booklet is reduced.

(Item 2)

When a sheet S that does not satisfy the condition for enabling bonding is found in the middle of production of a booklet, a usage amount of the powder bonding agent for a bonding image of a sheet S thereafter can be reduced.

(Item 3)

The lower tray 37 is an example of a first stacking unit. The upper tray 25 is an example of a second stacking unit. As described above, a bundle of sheets on which a bonding image is formed and a bundle of sheets on which a bonding image is not formed can be discharged to different trays. As a result, it can be possible for the user to recognize that there is a sheet bundle to be bound manually. A sheet bundle to be discharged to the lower tray 37 can be subjected or not subjected to bonding processing. An i-th sheet to an M-th sheet can also be discharged to the first stacking unit.

(Item 4)

When a sheet S that does not satisfy the condition for enabling bonding is found, a density of a bonding image of a sheet S thereafter can be reduced. As a result, the consumption amount of the powder bonding agent is reduced.

(Item 5)

A bonding image can be utilized as an image for assisting the user.

(Item 6)

Such a condition for enabling bonding is merely one illustrative example. Any condition by which a sheet S having a characteristic that interferes with bonding of a booklet can be identified can be adopted as the condition for enabling bonding.

(Item 7)

The size sensor 11 and the sheet sensor 27 are examples of a detection unit. There is a limitation on a size of a sheet S that can be aligned in the intermediate stack section 42. Therefore, a sheet S that is too large and cannot be aligned can be excluded from being a bonding target.

(Item 8)

As described above, a sheet S that is too small and cannot be aligned can be excluded from being a bonding target.

(Item 9)

In some cases, a sheet S of a size designated by the user is not stored in the sheet cassette 8. Such a case can interfere with bonding of a booklet. Therefore, such a sheet S can be excluded from being a bonding target.

(Item 10)

If a plurality of sheets S of different sizes are mixed, there is a possibility that alignment of a sheet bundle can fail. Therefore, in such a case, the consumption amount of the powder bonding agent used for a bonding image can be reduced.

(Item 11)

As described above, a manufacturing variation of a sheet S and a detection variation of a sensor can be considered. When a difference exceeding such variations is found, it can be recognized that there are a plurality of sheets S of different sizes.

(Item 12)

For example, plain paper and thick paper both include paper as a material and are thus suitable for bonding. An OHP sheet is a resin-made film and thus is not suitable for bonding. Therefore, a predetermined type of sheet S suitable for bonding or a predetermined type of sheet S not suitable for bonding can be determined.

(Item 13)

The media sensor 12 is an example of a detection unit. In some cases, a sheet S of a type designated by the user is not stored in the sheet cassette 8. In this case, there is a possibility that it can interfere with bonding of a booklet. Therefore, such sheet S can be excluded from being a bonding target.

(Item 14)

As materials, there can be paper, resin, cloth, and the like.

(Item 15)

An OHP sheet is an example of a sheet including resin as a material.

(Item 16)

The image signal generation unit 621 is an example of a first generation unit/circuit. The masking unit 633 is an example of a second generation unit/circuit.

(Item 17)

As illustrated in FIG. 11B, the usage amount of the powder bonding agent can be reduced by reducing an amount of light for the i-th sheet to the M-th sheet.

(Item 18)

As described in relation to the selection unit 1201, a behavior after a sheet S that does not satisfy the condition for enabling bonding is found can be selected by the user. As a result, it can be possible to reflect the user's desire.

(Item 19)

The condition for enabling bonding can be defined in view of the alignment processing. As a result, failures in producing a booklet due to a failure in alignment can be reduced.

(Item 20)

The discharge rollers 34 are an example of a discharge unit.

(Item 21)

The error determination unit 610 is an example of a determination unit. The determination unit can be provided in either the image forming apparatus 100 or the post-processing apparatus 300.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-122741, filed Jul. 27, 2023 which is hereby incorporated by reference herein in its entirety.

What is claimed is:

1. An image forming system comprising:

an image forming unit configured to form a user image and a bonding image formed in a binding margin of a booklet and is for bonding a plurality of sheets forming the booklet; and a bonding unit configured to bond the plurality of sheets by applying heat and pressure to the binding margin of the plurality of sheets, wherein the image forming unit forms the user image and forms the bonding image at a first density on a sheet that satisfies a condition for enabling bonding from among the plurality of sheets, and wherein the image forming unit forms the user image and does not form the bonding image or forms the bonding image at a second density lower than the first density on a sheet that does not satisfy the condition for enabling bonding from among the plurality of sheets.

2. The image forming system according to claim 1, wherein the plurality of sheets are constituted by M sheets, a first sheet to an i−1-th sheet from among the M sheets each satisfy the condition for enabling bonding, an i-th sheet from among the plurality of sheets does not satisfy the condition for enabling bonding, the image forming unit forms the user image and forms the bonding image at the first density on each of the first sheet to the i−1-th sheet, and the image forming unit forms the user image and does not form the bonding image or forms the bonding image at the second density lower than the first density on each of the i-th sheet to the M-th sheet.

3. The image forming system according to claim 2, further comprising:

a first stacking tray configured to stack the first sheet to the i−1-th sheet from among the plurality of sheets; and a second stacking tray configured to stack the i-th sheet to the M-th sheet from among the plurality of sheets.

4. The image forming system according to claim 3, wherein the bonding image is formed at the second density on the i-th sheet to the M-th sheet to be stacked on the second stacking tray.

5. The image forming system according to claim 4, wherein the bonding image formed on the i-th sheet to the M-th sheet to be stacked on the second stacking tray indicate a position where stapling or gluing is to be performed.

6. The image forming system according to claim 1, wherein the condition for enabling bonding includes at least one of:

a condition that a size of sheet is less than or equal to a predetermined upper limit size, a condition that the size of sheet is greater than or equal to a predetermined lower limit size, a condition that the size of sheet is a size designated by the user, a condition that respective sizes of the plurality of sheets match, a condition that a type of sheet is a predetermined type;

a condition that the type of sheet is a type designated by the user, or a condition that a total number of the plurality of sheets forming the booklet is less than or equal to a maximum number of sheets that can be bonded in the bonding unit.

7. The image forming system according to claim 6, further comprising:

a sensor configured to detect the respective sizes of the plurality of sheets; and a controller configured to determine whether the detected respective sizes are less than or equal to the predetermined upper limit size.

8. The image forming system according to claim 6, further comprising:

a sensor configured to detect the respective sizes of the plurality of sheets; and a controller configured to determine whether the detected respective sizes are greater than or equal to the predetermined lower limit size.

9. The image forming system according to claim 6, further comprising:

a sensor configured to detect the respective sizes of the plurality of sheets; and a controller configured to determine whether the detected respective sizes of the sheets are the size designated by the user.

10. The image forming system according to claim 6, further comprising:

a sensor configured to detect the respective sizes of the plurality of sheets; and a controller configured to determine whether the detected respective sizes of the plurality of sheets match.

11. The image forming system according to claim 10, wherein the controller is further configured to obtain a maximum size and a minimum size in the respective sizes of the plurality of sheets, and in a case where a difference between the maximum size and the minimum size is less than or equal to a threshold, determine that the respective sizes of the plurality of sheets match, and in a case where the difference between the maximum size and the minimum size exceeds the threshold, determine that the respective sizes of the plurality of sheets do not match.

12. The image forming system according to claim 6, further comprising:

a sensor configured to detect respective types of the plurality of sheets; and a controller configured to determine whether the detected respective types of the sheets are the predetermined type.

13. The image forming system according to claim 6, further comprising:

a sensor configured to detect respective types of the plurality of sheets; and a controller configured to determine whether the detected respective types of the sheets are the type designated by the user.

14. The image forming system according to claim 1, wherein a type of the sheet is a type related to a material of the sheet.

15. The image forming system according to claim 14, wherein the type of the sheet that does not satisfy the condition for enabling bonding is a sheet including resin as a material.

16. The image forming system according to claim 2, further comprising:

a first generation unit configured to generate an image signal corresponding to the user image and the bonding image; and a second generation unit configured to generate an inhibiting signal that inhibits generation or output of the image signal generated by the first generation unit, wherein for each of the first sheet to the i−1-th sheet, the second generation unit does not generate the inhibiting signal in a period in which the image signal for the bonding image is generated, and wherein for each of the i-th sheet to the M-th sheet, the second generation unit generates the inhibiting signal in the period in which the image signal for the bonding image is generated.

17. The image forming system according to claim 2, wherein the image forming unit includes:

a photosensitive body;

an exposure light source configured to form an electrostatic latent image by irradiating the photosensitive body with light corresponding to the user image and the bonding image;

a developing member configured to form a toner image by developing the electrostatic latent image using toner;

a transfer member configured to transfer the toner image from the photosensitive body to a sheet;

a fixing rotary body configured to fix the toner image to the sheet; and an exposure controller configured to control the exposure light source, wherein the exposure controller is further configured to:

control, from the first sheet to the i−1-th sheet, an amount of light of the exposure light source to be a first light amount; and control, from the i-th sheet to the M-th sheet, the amount of light of the exposure light source to be a second light amount smaller than the first light amount in a period in which the photosensitive body is irradiated with light for the bonding image.

18. The image forming system according to claim 1, further comprising:

a controller configured to:

determine whether a sheet that does not satisfy the condition for enabling bonding is included in the plurality of sheets; and in a case where the sheet that does not satisfy the condition for enabling bonding is included in the plurality of sheets, select whether to continue forming an image for the plurality of sheets, wherein in a case where the controller selects to continue forming an image for the plurality of sheets, the image forming unit forms the user image and does not form the bonding image or forms the bonding image at the second density lower than the first density for the plurality of sheets, and wherein in a case where the controller selects not to continue forming an image for the plurality of sheets, the image forming unit stops forming an image for the plurality of sheets.

19. The image forming system according to claim 1, wherein the bonding unit includes an alignment unit configured to align the plurality of sheets, and the condition for enabling bonding includes not interfering with processing for aligning the plurality of sheets in the alignment unit.

20. An image forming apparatus comprising:

an image forming unit configured to form a user image arbitrarily prepared by a user and a bonding image that is formed in a binding margin of a booklet and is for bonding a plurality of sheets forming the booklet; and a discharge roller configured to discharge the plurality of sheets to a post-processing apparatus including a bonding unit configured to bond the plurality of sheets discharged by the discharge roller by applying heat and pressure to the binding margin of the plurality of sheets, wherein the image forming unit forms the user image and forms the bonding image at a first density on a sheet that satisfies a condition for enabling bonding from among the plurality of sheets, and the image forming unit forms the user image and does not form the bonding image or forms the bonding image at a second density lower than the first density on a sheet that does not satisfy the condition for enabling bonding from among the plurality of sheets.

21. An image forming system comprising:

an image forming apparatus configured to form a user image and a bonding image formed in a binding margin of a booklet and is for bonding a plurality of sheets forming the booklet; and a post-processing apparatus including a bonding unit configured to bond the plurality of sheets conveyed from the image forming apparatus by applying heat and pressure to the binding margin of the plurality of sheets; and a controller configured to determine that there is an error when a sheet that does not satisfy a condition for enabling bonding in the bonding unit is included in the plurality of sheets, wherein in a case where the controller does not determine that there is an error, the image forming apparatus forms the user image and forms the bonding image at a first density, and wherein in a case where the controller determines that there is an error, the image forming apparatus forms the user image and does not form the bonding image or forms the bonding image at a second density lower than the first density.

* * * * *